(12) United States Patent
Raghavan et al.

(10) Patent No.: US 11,742,890 B2
(45) Date of Patent: *Aug. 29, 2023

(54) RADIO FREQUENCY COMMUNICATION SYSTEMS WITH INTERFERENCE CANCELLATION FOR COEXISTENCE

(71) Applicant: Skyworks Solutions, Inc., Irvine, CA (US)

(72) Inventors: Anand Raghavan, Middleton, WI (US); David Richard Pehlke, Westlake Village, CA (US); Poul Olesen, Stoevring (DK)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,393

(22) Filed: Aug. 25, 2022

(65) Prior Publication Data

US 2022/0416837 A1    Dec. 29, 2022

Related U.S. Application Data

(63) Continuation of application No. 16/738,834, filed on Jan. 9, 2020, now Pat. No. 11,558,079.

(Continued)

(51) Int. Cl.
*H04B 1/525* (2015.01)
*H04B 1/12* (2006.01)
(Continued)

(52) U.S. Cl.
CPC ........... *H04B 1/525* (2013.01); *H04B 1/0475* (2013.01); *H04B 1/123* (2013.01); *H04B 7/15585* (2013.01); *H04L 5/1461* (2013.01)

(58) Field of Classification Search
CPC ...... H04B 1/525; H04B 1/0475; H04B 1/123; H04B 7/15585; H04L 5/1461
See application file for complete search history.

(56) References Cited

U.S. PATENT DOCUMENTS

| | | | |
|---|---|---|---|
| 4,902,992 A | 2/1990 | Rubin et al. | |
| 6,101,228 A | 8/2000 | Hebron et al. | |

(Continued)

FOREIGN PATENT DOCUMENTS

| | | |
|---|---|---|
| CN | 101512919 | 8/2009 |
| EP | 2637313 | 9/2013 |

(Continued)

OTHER PUBLICATIONS

International Search Report and Written Opinion for International Application No. PCT/US2019/047082 dated Dec. 2, 2019 in 9 pages.

(Continued)

*Primary Examiner* — Lester G Kincaid
*Assistant Examiner* — Maryam Soltanzadeh
(74) *Attorney, Agent, or Firm* — Knobbe, Martens, Olson & Bear, LLP

(57) ABSTRACT

Radio frequency (RF) communication systems with interference cancellation for coexistence are provided herein. In certain embodiments, an RF communication system includes a transmitter including a power amplifier that amplifies an RF transmit signal to generate an amplified RF transmit signal, a receiver including a low noise amplifier (LNA) that amplifies an RF receive signal, and an interference cancellation circuit. The interference cancellation circuit includes a filter that generates an analog interference cancellation signal based on filtering the amplified radio frequency transmit signal, a controllable phase circuit that provides a phase adjustment to the analog interference (Continued)

cancellation signal, and a controllable gain circuit that provides a gain adjustment to the analog interference cancellation signal. The interference cancellation circuit injects the analog interference cancellation signal into the LNA to compensate the receiver for interference arising from the transmitter.

20 Claims, 13 Drawing Sheets

Related U.S. Application Data

(60) Provisional application No. 62/792,508, filed on Jan. 15, 2019.

(51) Int. Cl.
  *H04B 7/155* (2006.01)
  *H04L 5/14* (2006.01)
  *H04B 1/04* (2006.01)

(56) References Cited

U.S. PATENT DOCUMENTS

| | | |
|---|---|---|
| 6,226,322 B1 | 5/2001 | Mukherjee |
| 6,539,068 B2 | 3/2003 | Hebron et al. |
| 6,965,657 B1 | 11/2005 | Rezvani et al. |
| 7,146,133 B2 | 12/2006 | Bahl et al. |
| 7,305,216 B2 | 12/2007 | Boos |
| 7,412,217 B2 | 8/2008 | Boos |
| 7,565,112 B2 | 7/2009 | Ragan |
| 7,620,373 B2 | 11/2009 | Cole et al. |
| 8,121,573 B2 | 2/2012 | Haralabidis et al. |
| 8,325,865 B1 | 12/2012 | Rofougaran et al. |
| 8,346,196 B2 | 1/2013 | Haralabidis et al. |
| 8,553,610 B2 | 10/2013 | Gainey et al. |
| 8,553,622 B2 | 10/2013 | Yang |
| 8,599,709 B2 | 12/2013 | Chen et al. |
| 8,681,748 B2 | 3/2014 | Medapalli et al. |
| 8,706,032 B2 | 4/2014 | Zhang et al. |
| 8,750,926 B2 | 6/2014 | Fu et al. |
| 8,767,869 B2 | 7/2014 | Rimini et al. |
| 8,842,546 B2 | 9/2014 | Chen et al. |
| 8,934,362 B2 | 1/2015 | Hsu et al. |
| 8,995,321 B2 | 3/2015 | Medapalli |
| 9,001,935 B2 | 4/2015 | Guo et al. |
| 9,148,233 B2 | 9/2015 | Haralabidis et al. |
| 9,191,041 B2 | 11/2015 | Mkadem et al. |
| 9,220,046 B2 | 12/2015 | Chen et al. |
| 9,220,072 B2 | 12/2015 | Hsu et al. |
| 9,232,443 B2 | 1/2016 | Fu et al. |
| 9,232,564 B2 | 1/2016 | Medapalli et al. |
| 9,319,887 B2 | 4/2016 | Chen et al. |
| 9,326,310 B2 | 4/2016 | Zhang et al. |
| 9,413,473 B2 | 8/2016 | Wang et al. |
| 9,438,284 B2 | 9/2016 | Wang et al. |
| 9,462,528 B2 | 10/2016 | Chen et al. |
| 9,544,813 B2 | 1/2017 | Wasily |
| 9,648,518 B2 | 5/2017 | Chen et al. |
| 9,722,639 B2 | 8/2017 | Khlat et al. |
| 9,730,014 B2 | 8/2017 | Balaban et al. |
| 9,775,147 B2 | 9/2017 | Kenney et al. |
| 9,894,708 B2 | 2/2018 | Ko et al. |
| 9,918,341 B2 | 3/2018 | Papaleo et al. |
| 9,924,547 B2 | 3/2018 | Zhang et al. |
| 9,929,849 B2 | 3/2018 | Medapalli |
| 9,936,414 B2 | 4/2018 | Chai et al. |
| 9,942,797 B2 | 4/2018 | Wasily |
| 9,955,379 B2 | 4/2018 | Chen et al. |
| 9,998,158 B2 | 6/2018 | Smith |
| 10,063,292 B2 | 8/2018 | Hirsch et al. |
| 10,172,143 B2 | 1/2019 | Gebhard |
| 10,257,746 B2 | 4/2019 | Jain et al. |
| 10,292,054 B2 | 5/2019 | Khojastepour et al. |
| 10,299,135 B2 | 5/2019 | Richards et al. |
| 10,312,976 B2 | 6/2019 | Chang et al. |
| 10,361,835 B2 | 7/2019 | Guo et al. |
| 10,700,766 B2 | 6/2020 | Khandani |
| 10,749,565 B1 | 8/2020 | Williams |
| 10,840,957 B2 | 11/2020 | Raghavan |
| 10,840,958 B2 | 11/2020 | Raghavan |
| 10,855,325 B2 | 12/2020 | Raghavan |
| 10,992,335 B2 | 4/2021 | Elmaghraby et al. |
| 11,082,074 B2 | 8/2021 | Choi et al. |
| 11,265,029 B2 | 3/2022 | Raghavan |
| 11,283,480 B2 | 3/2022 | Raghavan |
| 11,309,927 B2 | 4/2022 | Raghavan |
| 11,558,079 B2 | 1/2023 | Raghavan et al. |
| 2001/0008383 A1 | 7/2001 | Nishida et al. |
| 2001/0033119 A1 | 10/2001 | Nguyen |
| 2003/0185309 A1 | 10/2003 | Pautler et al. |
| 2005/0020297 A1 | 1/2005 | Axness et al. |
| 2008/0089397 A1 | 4/2008 | Vetter et al. |
| 2008/0181337 A1 | 7/2008 | Maxim |
| 2008/0219377 A1 | 9/2008 | Nisbet |
| 2009/0047914 A1 | 2/2009 | Axness et al. |
| 2009/0161801 A1 | 6/2009 | Huang et al. |
| 2010/0246557 A1 | 9/2010 | Ishizaki |
| 2011/0205986 A1 | 8/2011 | Medapalli |
| 2011/0227642 A1 | 9/2011 | Hoyerby et al. |
| 2011/0256857 A1 | 10/2011 | Chen et al. |
| 2012/0182896 A1 | 7/2012 | Jang et al. |
| 2012/0214426 A1 | 8/2012 | Koller et al. |
| 2012/0281550 A1 | 11/2012 | Huang |
| 2013/0044791 A1 | 2/2013 | Rimini et al. |
| 2013/0102254 A1 | 4/2013 | Cyzs et al. |
| 2013/0114583 A1 | 5/2013 | Park et al. |
| 2013/0259099 A1 | 10/2013 | Gudem et al. |
| 2014/0003300 A1 | 1/2014 | Weissman et al. |
| 2014/0161159 A1 | 6/2014 | Black et al. |
| 2014/0194071 A1 | 7/2014 | Wyville |
| 2014/0247757 A1 | 9/2014 | Rimini et al. |
| 2014/0269852 A1 | 9/2014 | Pratt et al. |
| 2014/0269858 A1 | 9/2014 | Lukashevich et al. |
| 2014/0301498 A1 | 10/2014 | Rimini et al. |
| 2014/0341196 A1 | 11/2014 | Liang et al. |
| 2015/0065064 A1 | 3/2015 | Hwang et al. |
| 2015/0126146 A1 | 5/2015 | Wang et al. |
| 2015/0139122 A1 | 5/2015 | Rimini et al. |
| 2015/0146583 A1 | 5/2015 | Yoon et al. |
| 2015/0215471 A1 | 7/2015 | Ljung |
| 2015/0280757 A1 | 10/2015 | Beidas et al. |
| 2015/0295602 A1 | 10/2015 | Lo et al. |
| 2016/0028375 A1 | 1/2016 | Feldman et al. |
| 2016/0087658 A1 | 3/2016 | Weissman et al. |
| 2016/0099733 A1 | 4/2016 | Weissman et al. |
| 2016/0173165 A1 | 6/2016 | Choi et al. |
| 2016/0211882 A1 | 7/2016 | Hwang et al. |
| 2016/0242183 A1 | 8/2016 | Kang et al. |
| 2016/0294425 A1 | 10/2016 | Hwang et al. |
| 2016/0380706 A1 | 12/2016 | Tanzi et al. |
| 2017/0026064 A1 | 1/2017 | Khlat et al. |
| 2017/0063425 A1 | 3/2017 | Khlat et al. |
| 2017/0077967 A1 | 3/2017 | Srirattana et al. |
| 2017/0127345 A1 | 5/2017 | Ge |
| 2017/0163295 A1 | 6/2017 | Talty et al. |
| 2017/0187431 A1 | 6/2017 | Zhu |
| 2017/0257136 A1 | 9/2017 | Gianvittorio et al. |
| 2017/0288842 A1 | 10/2017 | Lim et al. |
| 2018/0062675 A1 | 3/2018 | Pratt et al. |
| 2018/0063745 A1 | 3/2018 | Jain et al. |
| 2018/0083658 A1 | 3/2018 | Dor et al. |
| 2018/0092117 A1 | 3/2018 | Azizi et al. |
| 2018/0109243 A1 | 4/2018 | Takamine |
| 2018/0110090 A1 | 4/2018 | Um et al. |
| 2018/0167137 A1 | 6/2018 | Azizi et al. |
| 2018/0175902 A1 | 6/2018 | Lakhani et al. |
| 2018/0279370 A1 | 9/2018 | Tao et al. |
| 2018/0317127 A1 | 11/2018 | Chen et al. |
| 2018/0332506 A1 | 11/2018 | Manepalli et al. |
| 2018/0368082 A1 | 12/2018 | O'Shea et al. |
| 2019/0036563 A1 | 1/2019 | Koshy et al. |
| 2019/0036622 A1 | 1/2019 | Lagoy et al. |

(56) References Cited

U.S. PATENT DOCUMENTS

| | | |
|---|---|---|
| 2019/0215140 A1 | 7/2019 | Hafeez et al. |
| 2019/0261412 A1 | 8/2019 | Novlan et al. |
| 2019/0305419 A1 | 10/2019 | Ling |
| 2020/0067606 A1 | 2/2020 | Raghavan |
| 2020/0228159 A1 | 7/2020 | Raghavan et al. |
| 2021/0098897 A1 | 4/2021 | Pehlke et al. |
| 2021/0099199 A1 | 4/2021 | Pehlke et al. |
| 2021/0119654 A1 | 4/2021 | Raghavan |
| 2022/0209802 A1 | 6/2022 | Raghavan |
| 2022/0209804 A1 | 6/2022 | Raghavan |
| 2022/0239330 A1 | 7/2022 | Raghavan |

FOREIGN PATENT DOCUMENTS

| | | |
|---|---|---|
| EP | 2822189 | 1/2015 |
| KR | 10-2019-0026449 A | 3/2019 |
| TW | 2014-06105 | 2/2014 |
| WO | WO 2004/095763 | 11/2004 |
| WO | WO 2012/098754 | 7/2012 |
| WO | WO 2014/195830 A1 | 12/2014 |
| WO | WO 2017/036412 | 3/2017 |
| WO | WO 2020/041206 | 2/2020 |
| WO | WO 2020/041209 | 2/2020 |
| WO | WO 2020/041210 | 2/2020 |
| WO | WO 2020/041212 | 2/2020 |
| WO | WO 2021/061792 | 4/2021 |
| WO | WO 2021/061834 | 4/2021 |

OTHER PUBLICATIONS

International Search Report and Written Opinion for International Application No. PCT/US2019/047086 dated Dec. 2, 2019 in 10 pages.
International Search Report and Written Opinion for International Application No. PCT/US2019/047088 dated Dec. 3, 2019 in 10 pages.
International Search Report and Written Opinion for International Application No. PCT/US2019/047091 dated Dec. 3, 2019 in 10 pages.
International Search Report and Written Opinion for International Application No. PCT/US2020/052245 dated Dec. 23, 2020 in 9 pages.
International Preliminary Report and Written Opinion for International Application No. PCT/US2020/052245 dated Mar. 16, 2022, in 7 pages.
International Search Report and Written Opinion for International Application No. PCT/US2020/052297 dated Dec. 30, 2020 in 10 pages.
International Preliminary Report on Patentability and Written Opinion for International Application No. POT/US2020/052297 dated Mar. 15, 2022, in 6 pages.
Pui-Ho, "Study of spectral regrowth and harmonic tuning in microwave power amplifier", Doctoral dissertation, The Chinese University of Hong Kong, https://core.ac.uk/download/pdf/48534417, accessed Aug. 22, 2022.
Van Moer, "Measure-based nonlinear modeling of spectral regrowth", IEEE Transactions on Instrumentation and Measurement, vol. 50(6):1711-1716 (2001).
Behzad, "Wireless LAN radios: System definition to transistor design", John Wiley & Sons, pp. 29-32 (2007); https://www.google.co/uk/books/edition/Wireless_LAN_Radios/d2Xznl9LApYC.
Iniewski et al., "Wireless Technologies: Circuits, Systems, and Devices", CRC Press, pp. 267-303 (2008).
Lindenmeier et al., "Electromagnetics and network theory and their microwave technology applications: A tribute to Peter Russer", Springer Science & Business Media, see Chapter 19:263 (2011).
Nelson, "Understanding adjacent channel power measurements in spectrum analysis", Microwaves & RF; available from https://www.mwrf.com/technologies/test-measurement/article/21845568/keysight-technologies-understanding-adjacent-channel-power-measurements-in-spectrum-analysis, accessed Jul. 3, 2023. See "AGP history".
Oppenheim et al., "Discrete-time signal processing", Second Edition, Chapters 1, 2, 7 Prentice Hall (1999).

RADIO FREQUENCY COMMUNICATION SYSTEMS WITH INTERFERENCE CANCELLATION FOR COEXISTENCE

CROSS-REFERENCE TO RELATED APPLICATIONS

This application is a continuation of U.S. patent application Ser. No. 16/738,834, filed Jan. 9, 2020 and titled "RADIO FREQUENCY COMMUNICATION SYSTEMS WITH INTERFERENCE CANCELLATION FOR COEXISTENCE," which claims the benefit of priority under 35 U.S.C. § 119 of U.S. Provisional Patent Application No. 62/792,508, filed Jan. 15, 2019 and titled "RADIO FREQUENCY COMMUNICATION SYSTEMS WITH INTERFERENCE CANCELLATION FOR COEXISTENCE," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for certain communications standards.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a plurality of front end systems including a first front end system and a second front end system. The mobile device further includes a plurality of transceivers including a first transceiver including a transmitter configured to transmit a transmit signal through the first front end system, and a second transceiver including a receiver configured to process a receive signal from the second front end system. The mobile device further includes an interference cancellation circuit configured to generate an interference cancellation signal that compensates the receiver for interference arising from the transmitter. The interference cancellation circuit includes a filter configured to filter the transmit signal, a controllable phase circuit configured to provide a phase adjustment to the interference cancellation signal, and a controllable gain circuit configured to provide a gain adjustment to the interference cancellation signal.

In various embodiments, the first transceiver is a cellular transceiver and the second transceiver is a WiFi transceiver.

In several embodiments, the receiver includes a low noise amplifier, and the interference cancellation circuit is configured to inject the interference cancellation signal before an input to the low noise amplifier.

In some embodiments, the receiver includes a low noise amplifier, and the interference cancellation circuit is configured to inject the interference cancellation signal after an output of the low noise amplifier.

In a number of embodiments, the receiver includes a low noise amplifier, the interference cancellation circuit configured to inject the interference cancellation signal into the low noise amplifier.

In several embodiments, the interference cancellation circuit is coupled to the transmitter via a directional coupler.

In various embodiments, the interference cancellation circuit is coupled to the transmitter without a directional coupler.

In some embodiments, the interference cancellation circuit is configured to inject the interference cancellation signal via a directional coupler.

In a number of embodiments, the interference cancellation circuit is configured to inject the interference cancellation signal without a directional coupler.

In various embodiments, the first front end system is coupled to a first antenna, and the second front end system is coupled to a second antenna.

In some embodiments, the first front end system and the second front end system are coupled to a common antenna.

In several embodiments, the filter includes a plurality of selectable filters providing different filtering characteristics. According to a number of embodiments, a selected filter of the plurality of the selectable filters is based on a transmit band of the transmitter.

In various embodiments, the controllable gain circuit includes at least one controllable attenuator.

In a number of embodiments, the controllable gain circuit includes at least one controllable amplifier.

In several embodiments, the controllable phase circuit includes at least one controllable phase shifter.

In some embodiments, the interference cancellation signal compensates for interference arising from spectral regrowth.

In several embodiments, the interference cancellation signal compensates for interference arising from direct transmit leakage.

In a number of embodiments, the interference cancellation signal compensates for interference arising from harmonic interference.

In various embodiments, the transmit signal is a Band 7 transmit signal.

In several embodiments, the transmit signal is a Band 40 transmit signal.

In some embodiments, the transmit signal is a Band 41 transmit signal.

In a number of embodiments, the mobile device further includes a radio access unit configured to control at least one of the phase adjustment or the gain adjustment provided by the interference cancellation circuit. According to several embodiments, the receiver is coupled to the radio access unit.

In various embodiments, the receiver detects an amount of interference, and controls at least one of the phase adjustment or the gain adjustment based on the detected amount of interference.

In several embodiments, the interference cancellation signal is configured to generate at least two interference compensation signals for compensating two or more receivers. According to a number of embodiments, the interference cancellation circuit includes a Wilkinson splitter. In accordance with various embodiments, the interference cancellation circuit includes a first amplifier operable to amplify a first interference compensation signal of the at least two interference compensation signals, and a second amplifier operable to amplify a second interference compensation signal of the at least two interference compensation signals. According to some embodiments, the interference cancellation circuit includes a shared amplifier operable to amplify the at least two interference compensation signals. In accordance with a number of embodiments, the interference cancellation circuit includes a first controllable phase shifter operable to phase shift a first interference compensation signal of the at least two interference compensation signals, and a second controllable phase shifter operable to phase shift a second interference compensation signal of the at least two interference compensation signals.

In certain embodiments, the present disclosure relates to a method of interference cancellation in a mobile device. The method includes providing a transmit signal to a first front end system using a transmitter, processing a receive signal from a second front end system using a receiver, and compensating the receiver for interference arising from the transmitter using an interference cancellation circuit, including filtering the transmit signal to generate an interference cancellation signal, providing a phase adjustment to the interference cancellation circuit using a controllable phase circuit, and providing a gain adjustment to the interference cancellation signal using a controllable gain circuit.

In various embodiments, the method further includes injecting the interference cancellation signal before an input to a low noise amplifier of the receiver.

In several embodiments, the method further includes injecting the interference cancellation signal after an output of a low noise amplifier of the receiver.

In a number of embodiments, the method further includes injecting the interference cancellation signal into a low noise amplifier of the receiver.

In some embodiments, the method further includes filtering the transmit signal includes selecting a filter from a plurality of selectable filters having different filtering characteristics. According to various embodiments, the method further includes selecting the filter based on a transmit band of the transmitter.

In several embodiments, the method further includes compensating the receiver for interference comprises compensating for interference arising from spectral regrowth.

In a number of embodiments, the method further includes compensating the receiver for interference comprises compensating for interference arising from direct transmit leakage.

In various embodiments, the method further includes compensating the receiver for interference comprises compensating for interference arising from harmonic interference.

In some embodiments, the method further includes controlling at least one of the phase adjustment or the gain adjustment using a radio access unit.

In several embodiments, the method further includes detecting an amount of interference at the receiver, and controlling at least one of the phase adjustment or the gain adjustment based on the detected interference.

In a number of embodiments, the method further includes generating at least two interference compensation signals for compensating two or more receivers.

In certain embodiments, the present disclosure relates to an interference compensation system for a mobile device. The interference compensation system includes a transmit front end circuit, a transmitter configured to transmit a transmit signal through the transmit front end circuit, a receive front end circuit, a receiver configured to process a receive signal from the receive front end circuit, and an interference cancellation circuit configured to generate an interference cancellation signal that compensates the receiver for interference arising from the transmitter. The interference cancellation circuit includes a filter configured to filter the transmit signal, a controllable phase circuit configured to provide a phase adjustment to the interference cancellation signal, and a controllable gain circuit configured to provide a gain adjustment to the interference cancellation signal.

In various embodiments, the transmitter is a cellular transmitter and the receiver is a WiFi receiver.

In several embodiments, the receiver includes a low noise amplifier, and the interference cancellation circuit is configured to inject the interference cancellation signal before an input to the low noise amplifier.

In a number of embodiments, the receiver includes a low noise amplifier, and the interference cancellation circuit is configured to inject the interference cancellation signal after an output of the low noise amplifier.

In some embodiments, the receiver includes a low noise amplifier, and the interference cancellation circuit is configured to inject the interference cancellation signal into the low noise amplifier.

In various embodiments, the interference cancellation circuit is coupled to the transmitter via a directional coupler.

In several embodiments, the interference cancellation circuit is coupled to the transmitter without a directional coupler.

In a number of embodiments, the interference cancellation circuit is configured to inject the interference cancellation signal via a directional coupler.

In some embodiments, the interference cancellation circuit is configured to inject the interference cancellation signal without a directional coupler.

In various embodiments, the transmit front end circuit is coupled to a first antenna, and the receive front end circuit is coupled to a second antenna.

In several embodiments, the transmit front end circuit and the receive front end circuit are coupled to a common antenna.

In a number of embodiments, the filter includes a plurality of selectable filters providing different filtering characteristics. According to various embodiments, a selected filter of the plurality of the selectable filters is based on a transmit band of the transmitter.

In some embodiments, the controllable gain circuit includes at least one controllable attenuator.

In various embodiments, the controllable gain circuit includes at least one controllable amplifier.

In a number of embodiments, the controllable phase circuit includes at least one controllable phase shifter.

In several embodiments, the interference cancellation signal compensates for interference arising from spectral regrowth.

In some embodiments, the interference cancellation signal compensates for interference arising from direct transmit leakage.

In a number of embodiments, the interference cancellation signal compensates for interference arising from harmonic interference.

In various embodiments, the transmit signal is a Band 7 transmit signal.

In some embodiments, the transmit signal is a Band 40 transmit signal.

In a number of embodiments, the transmit signal is a Band 41 transmit signal.

In several embodiments, the interference compensation system further includes a radio access unit configured to control at least one of the phase adjustment or the gain adjustment provided by the interference cancellation circuit. According to a number of embodiments, the receiver is coupled to the radio access unit.

In various embodiments, the receiver detects an amount of interference, and controls at least one of the phase adjustment or the gain adjustment based on the detected amount of interference.

In a number of embodiments, the interference cancellation signal is configured to generate at least two interference compensation signals for compensating two or more receivers. According to several embodiments, the interference cancellation circuit includes a Wilkinson splitter. In accordance with some embodiments, the interference cancellation circuit includes a first amplifier operable to amplify a first interference compensation signal of the at least two interference compensation signals, and a second amplifier operable to amplify a second interference compensation signal of the at least two interference compensation signals. According to several embodiments, the interference cancellation circuit includes a shared amplifier operable to amplify the at least two interference compensation signals. In accordance with several embodiments, the interference cancellation circuit includes a first controllable phase shifter operable to phase shift a first interference compensation signal of the at least two interference compensation signals, and a second controllable phase shifter operable to phase shift a second interference compensation signal of the at least two interference compensation signals.

DETAILED DESCRIPTION OF EMBODIMENTS

Figure 1:
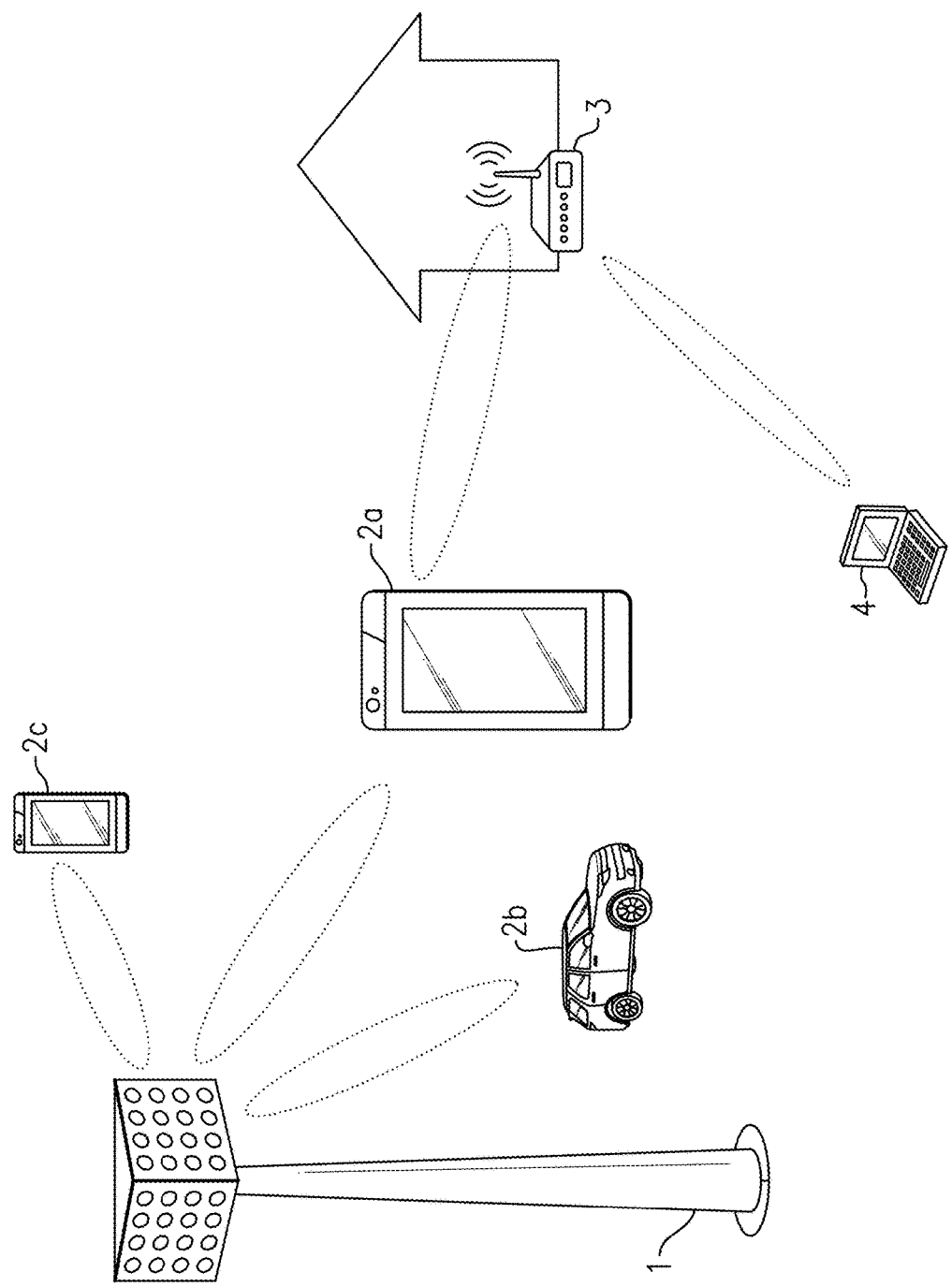
FIG. 1 is a schematic diagram of one example of a mobile device communicating via cellular and WiFi networks.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a mobile device 2a communicating via cellular and WiFi networks. For example, as shown in FIG. 1, the mobile device 2a communicates with a base station 1 of a cellular network and with a WiFi access point 3 of a WiFi network. FIG. 1 also depicts examples of other user equipment (UE) communicating with the base station 1, for instance, a wireless-connected car 2b and another mobile device 2c. Furthermore, FIG. 1 also depicts examples of other WiFi-enabled devices communicating with the WiFi access point 3, for instance, a laptop 4.

Although specific examples of cellular UE and WiFi-enabled devices is shown, a wide variety of types of devices can communicate using cellular and/or WiFi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, a mobile device, such as the mobile device 2a of FIG. 1, is implemented to support communications using a number of technologies, including, but not limited to, 2G, 3G, 4G (including LTE, LTE-Advanced, and LTE-Advanced Pro), 5G NR, WLAN (for instance, WiFi), WPAN (for instance, Bluetooth and Zig-Bee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

Although various examples of communication technologies have been described, mobile devices can be implemented to support a wide range of communications.

Various communication links have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Examples of RF Communication Systems with Interference Cancellation for Coexistence Radio frequency (RF) communication systems can include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a WiFi network. For instance, the mobile device 2a of FIG. 1 is operable to communicate using cellular and WiFi networks.

Although implementing the RF communication system in this manner can provide a number of benefits, a mutual desensitization effect can arise from cellular transmissions interfering with reception of WiFi signals and/or from WiFi transmissions interfering with reception of cellular signals.

In one example, cellular Band 7 can give rise to mutual desensitization with respect to 2.4 Gigahertz (GHz) WiFi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz WiFi has TDD duplex and operates over a frequency range of about 2.40 GHz to about 2.50 GHz. Thus, cellular Band 7 and 2.4 GHz WiFi are adjacent in frequency, and RF signal leakage due to the high power transmitter of one transceiver/front end affects receiver performance of the other transceiver/front end, particularly at border frequency channels.

In another example, cellular Band 40 and 2.4 GHz WiFi can give rise to mutual desensitization. For example, Band 40 has a TDD duplex and operates over a frequency range of about 2.30 GHz to about 2.40 GHz, while 2.4 GHz WiFi has TDD duplex and operates over a frequency range of about 2.40 GHz to about 2.50 GHz. Accordingly, cellular Band 40 and 2.4 GHz WiFi are adjacent in frequency and give rise to a number of coexistence issues, particularly at border frequency channels. In yet another example, cellular Band 41 and 2.4 GHz WiFi can also suffer from difficulties in coexisting.

Furthermore, frequency separation between bands used for WiFi and cellular Band 40, 41 and 7 is so small that use of filters alone is insufficient for signal separation when WiFi and cellular communications are simultaneous. For example, sensitivity of a WiFi receiver can be degraded by more than 40 dB in some cases due to the adjacent channel power level from the cellular transmitter.

Moreover, interference is exacerbated by increasing symbol rate, since higher symbol rate also leads to an increase in the bandwidth of adjacent power from the aggressor transmitter. Furthermore, a number of other factors can increase interference, including, but not limited to, closer antenna proximity, a greater degree of antenna sharing, an increase in the number of utilized frequency bands, a rise in the number of transceivers, inclusion of dual sim dual active (DSDA) features, and/or support for multiple-input multiple-output (MIMO) or diversity communications.

Desensitization can arise in a variety of ways, such as direct leakage of an aggressor transmit signal to a victim receiver, spectral regrowth components generated in the transmitter, and/or other interference sources. Such interference can lie relatively closely in frequency with the victim receive signal and/or directly overlap it. Although a receive filter can provide some filtering of signal leakage, the receive filter may provide insufficient attenuation of the aggressor signal, and thus the sensitivity of the victim receiver is degraded.

Conventional techniques alone are insufficient for providing mutual coexistence. In one example, a very high quality-factor (high Q) bandpass filter (for instance, an acoustic bandpass filter) can be included at the output of a power amplifier of an aggressor transmitter to attenuate spectral regrowth. When the attenuation provided by the filter is sufficiently high, the victim receiver may not be significantly desensitized due to non-linearity of the aggressor transmitter. However, such high-Q bandpass filters can be prohibitively expensive and/or introduce insertion loss that degrades transmit performance.

In another example, a very high Q bandpass filter can be included on the victim receiver to attenuate high power leakage coupled in from the aggressor transmitter. When the attenuation is sufficiently high, the victim receiver is not significantly desensitized from coupling of the high power leakage into non-linear receive circuitry of the victim receiver. However, such high-Q bandpass filters can be prohibitively expensive and/or introduce insertion loss that degrades receiver sensitivity.

RF communication systems with interference cancellation for coexistence are provided herein. In certain embodiments, an RF communication system includes a transmitter that transmits a transmit signal through a first front end system, a receiver that processes a receive signal from a second front end system, and an interference cancellation circuit that generates an interference cancellation signal that compensates the receiver for interference arising from the transmitter. The interference cancellation circuit includes a filter for filtering the transmit signal, a controllable phase circuit for adjusting a phase of the interference cancellation signal, and a controllable gain circuit for adjusting a gain of the interference cancellation signal.

By implementing the RF communication system in this manner, dynamic range and/or noise figure is improved, thereby enabling cancellation of aggressor signals close to a receiver's noise floor. Furthermore, the interference cancellation schemes herein can reduce an amount of receiver filtering and/or transmitter filtering, thereby relaxing filter constraints and permitting the use of lower cost filters. Furthermore, receiver sensitivity and/or transmitter efficiency can be enhanced with little to no increase in power consumption and/or componentry to RF signal paths.

In certain implementations, the filter serves to suppress the aggressor carrier while passing a portion of the aggressor interfering with the victim receiver, such as adjacent channel leakage ratio (ACLR) noise. For example, the filter couples noise to be cancelled into the interference cancellation circuit.

The filter can serve to bleed off power of the transmitter over a limited range of frequencies, thereby leading to relative low loading loss. Moreover, the filter can relax constraints of RF front end filters and lead to a decreased component cost, lower system power consumption, and/or superior noise figure. Thus, the RF communication system (for instance, UE, such as a mobile phone) operates with enhanced receiver sensitivity when the transmitter and receiver are operating simultaneously.

Although a directional coupler can be used without a filter to couple an aggressor signal, such directional couplers can lead to high loss in the transmit path, which can degrade transmit performance. Furthermore, noise figure can be relatively high due to high coupling loss, and a large amount of amplification may be needed to overcome loss, which can lead to a degradation in dynamic range. Moreover, transmit insertion loss may be unacceptably high in order to avoid amplifying thermal noise. As a result, noise power can become larger than the signal desired to be cancelled when the coupler loss is low.

The filter can be implemented in a wide variety of ways, which can vary based on application, implementation, and/or other considerations. For example, the filter can be implemented using one or more bandpass filters, low pass filters, high pass filters, band rejection filters, or a combination thereof.

In certain implementations, the transmitter/first front end system can process RF signals of a different type than the receiver/second front end system. In one example, the transmitter/first front end system processes cellular signals while the receiver/second front end system processes WLAN signals, such as WiFi signals. In certain implementations, the transmitter is included in a cellular transceiver, and the receiver is included in a WiFi transceiver. Thus, in certain implementations herein, coexistence is provided between cellular and WiFi radios.

However, the teachings herein are applicable to a wide range of RF communication systems, including, but not limited to systems communicating using 4G, 5G NR, WLAN, WPAN, WMAN, and/or GPS signaling. Furthermore, such RF communication systems can operate with a number of features, including, but not limited to, DSDA, MIMO, carrier aggregation, and/or diversity.

Figure 2:
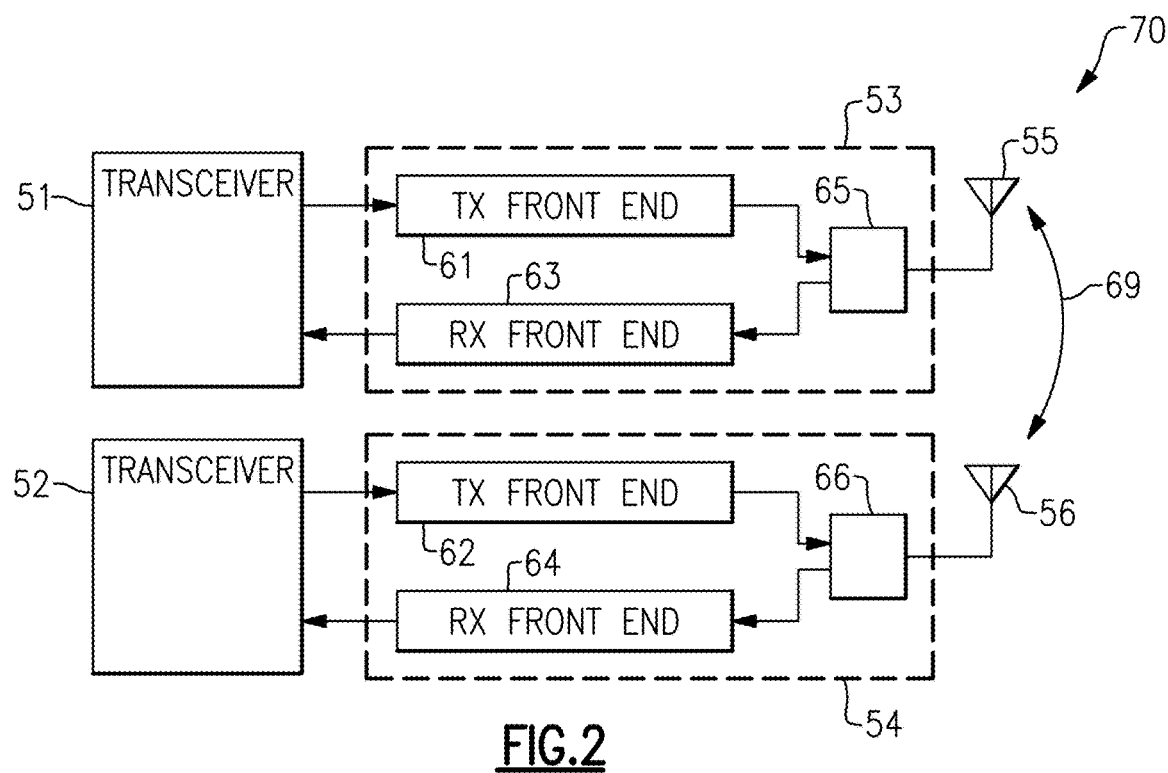
FIG. 2 is a schematic diagram of one example of signal leakage for an RF communication system.

FIG. 2 is a schematic diagram of one example of signal leakage for an RF communication system 70. As shown in FIG. 2, the RF communication system 70 includes a first transceiver 51 (including a first transmitter and a first receiver), a second transceiver 52 (including a second transmitter and a second receiver), a first front end system 53, a second front end system 54, a first antenna 55, and a second antenna 56.

Including multiple transceivers, front end systems, and antennas enhances the flexibility of the RF communication system 70. For instance, implementing the RF communication system 70 in this manner can allow the RF communication system 70 to communicate using different types of networks, for instance, cellular and WiFi networks.

In the illustrated embodiment, the first front end system 53 includes a transmit front end circuit 61, a receive front end circuit 63, and an antenna access circuit 65, which can include one or more switches, duplexers, diplexers, triplexers, quadplexers, circulators, and/or other circuitry for controlling access of the transmit front end circuit 61 and the receive front end circuit 63 to the first antenna 55. The second front end system 54 includes a transmit front end circuit 62, a receive front end circuit 64, and an antenna access circuit 66.

Although one example implementation of front end systems is shown in FIG. 2, the teachings herein are applicable to front end systems implemented in a wide variety of ways. Accordingly, other implementations of front end systems are possible.

RF signal leakage 69 between the first antenna 55 and the second antenna 56 can give rise to a number of coexistence issues. The interference cancellation schemes herein provide compensation to reduce or eliminate the impacts of such RF signal leakage. Moreover, interference cancellation can also be provided in implementations using a shared antenna.

Figure 3:
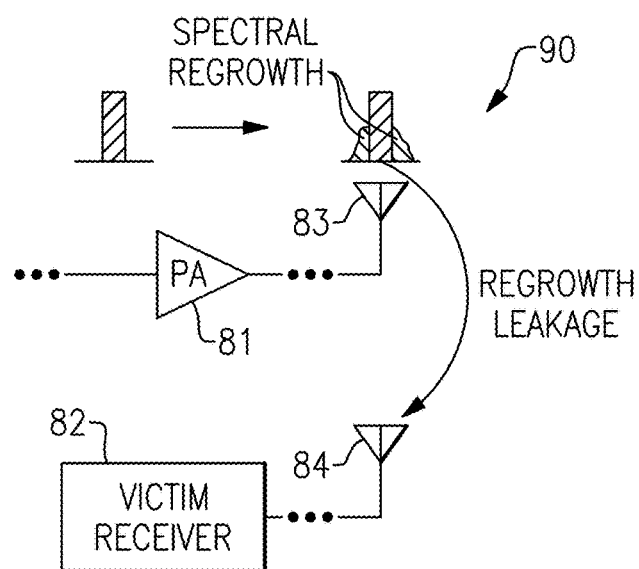
FIG. 3 is a schematic diagram of one example of regrowth leakage for an RF communication system.

FIG. 3 is a schematic diagram of one example of regrowth leakage for an RF communication system 90. The RF communication system 90 includes a power amplifier 81, a victim receiver 82, a first antenna 83, and a second antenna 84.

In this example, the power amplifier 81 receives an RF input signal, which is amplified by the power amplifier 81 to generate an RF output signal that is wirelessly transmitted using the first antenna 83. Additionally, non-linearity of the power amplifier 81 gives rise to spectral regrowth in the RF output signal that is close in frequency to RF signals processed by the victim receiver 82. Thus, regrowth leakage from the RF output signal gives rise to a degradation in receiver sensitivity.

Although certain embodiments herein are depicted in the context of compensating for spectral regrowth, any suitable type of interference can be cancelled in accordance with the teachings herein. In a first example, spectral regrowth is compensated. In a second example, direct transmit leakage is compensated. In a third example, harmonic interference (for instance, harmonics falling on a victim receive band) is compensated.

Figure 4:
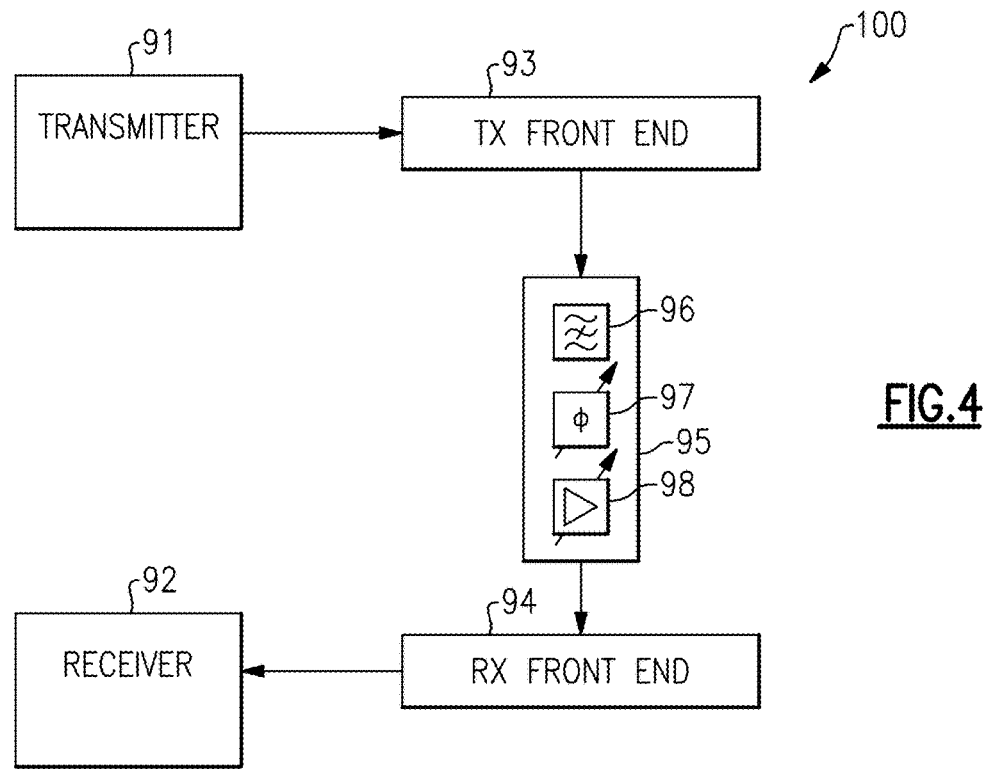
FIG. 4 is a schematic diagram of an RF communication system with interference cancellation according to one embodiment.

FIG. 4 is a schematic diagram of an RF communication system 100 with interference cancellation according to one embodiment. The RF communication system 100 includes a transmitter 91, a receiver 92, a transmit front end circuit 93, a receive front end circuit 94, and an interference cancellation circuit 95.

The transmitter 91 operates to transmit a transmit signal through the transmit front end circuit 93. Additionally, the receiver 92 processes a receive signal from the receive front end circuit 94.

As shown in FIG. 4, the interference cancellation circuit 95 includes a filter 96, a controllable phase circuit 97, and a controllable gain circuit 98. The interference cancellation circuit 95 generates an interference cancellation signal that compensates the receiver 92 for interference arising from the transmitter 91. To aid in providing cancellation, the filter 96 filters the transmit signal to inject a desired portion of the frequency spectrum of the transmit signal into the interference cancellation circuit 95. Additionally, the controllable phase circuit 97 and controllable gain circuit 98 provide phase and gain adjustment, respectively, to achieve a proper polarity and amplitude of the interference cancellation signal for interference cancellation.

Figure 5:
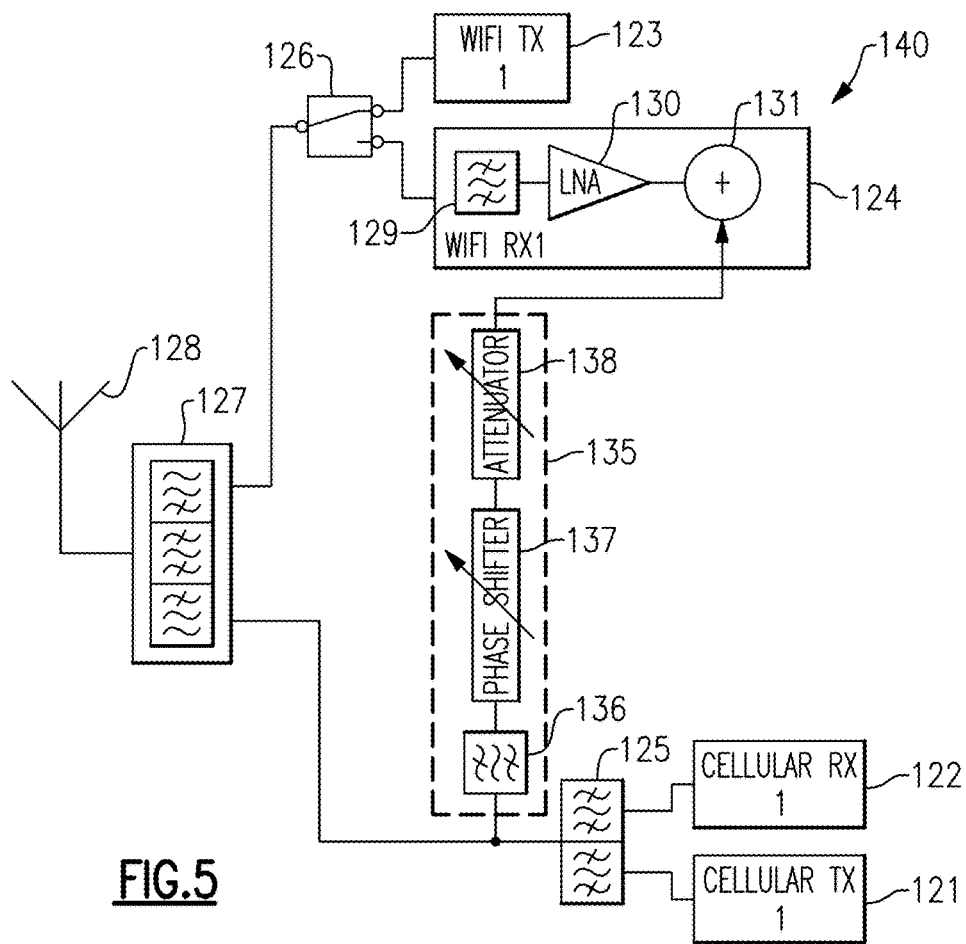
FIG. 5 is a schematic diagram of an RF communication system with interference cancellation according to another embodiment.

FIG. 5 is a schematic diagram of an RF communication system 140 with interference cancellation according to another embodiment. The RF communication system 140 includes a cellular transmitter 121, a cellular receiver 122, a WiFi transmitter 123, a WiFi receiver 124, a cellular duplexer 125, a WiFi transmit/receive switch 126, a triplexer 127, a shared antenna 128, and an interference cancellation circuit 135. The WiFi receiver 124 includes a WiFi receive filter 129, a WiFi LNA 130, and a signal combiner 131.

In the illustrated embodiment, the interference cancellation circuit 135 includes a bandpass filter 136, a controllable phase shifter 137, and a controllable attenuator 138. The bandpass filter 136 serves to provide filtering to obtain a portion of the transmit signal desired for cancellation. In one example, the bandpass filter 136 passes spectral regrowth in the WiFi receive band while blocking a carrier frequency of the cellular transmit signal from the cellular transmitter 121.

In certain implementations, the interference cancellation signal is provided with a relatively high amplitude at the output of the WiFi LNA 130 such that the signal is well above the noise floor. Thus, WiFi sensitivity can be reduced only by a relatively small amount, for instance, 0.03 dB at 18 dB of LNA gain and 0.11 dB at 12 dB of LNA gain when the signal combiner 131 is implemented as a 3 dB coupler.

Figure 6A:
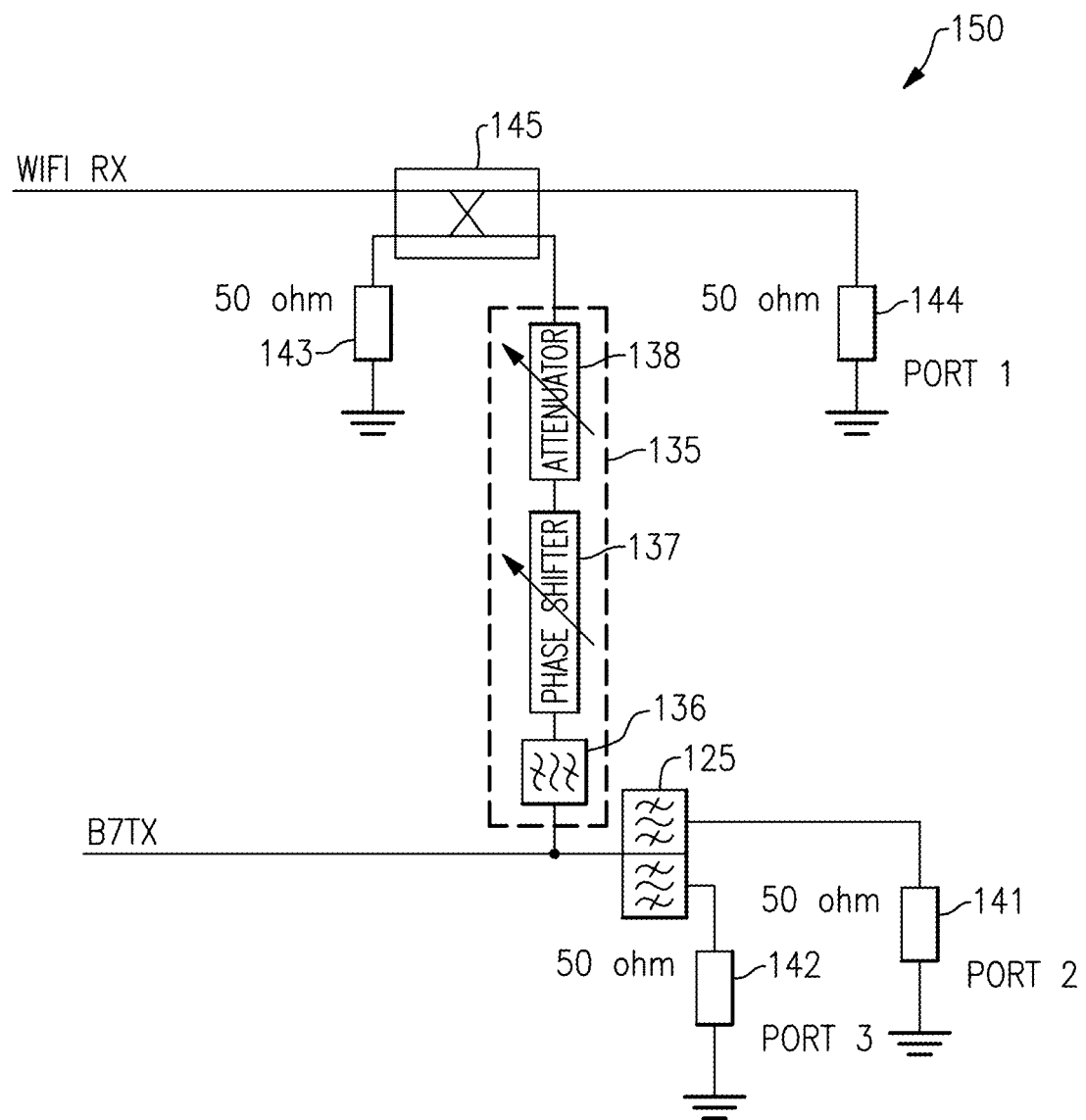
FIG. 6A is a schematic diagram of a simulation setup for an interference cancellation circuit according to one embodiment.

FIG. 6A is a schematic diagram of a simulation setup 150 for an interference cancellation circuit 135 according to one embodiment. The interference cancellation circuit 135 includes a bandpass filter 136, a controllable phase shifter 137, and a controllable attenuation circuit 138. The simulation setup 150 includes a first impedance 141 representing impedance of a cellular transmitter, a second impedance 142 representing impedance of a cellular receiver, a cellular duplexer 125 (Band 7, in this example), a WiFi directional coupler 145, a third impedance 143 representing a coupler termination, and a fourth impedance 144 representing impedance of a WiFi receiver.

In the illustrated embodiment, the bandpass filter 136 detects the aggressor signal to be cancelled without suffering from coupler loss in the cellular transmit path. In this example, the cancellation signal is provided from the interference cancellation circuit 135 to the WiFi directional coupler 145. However, other implementations are possible.

Figure 6B:
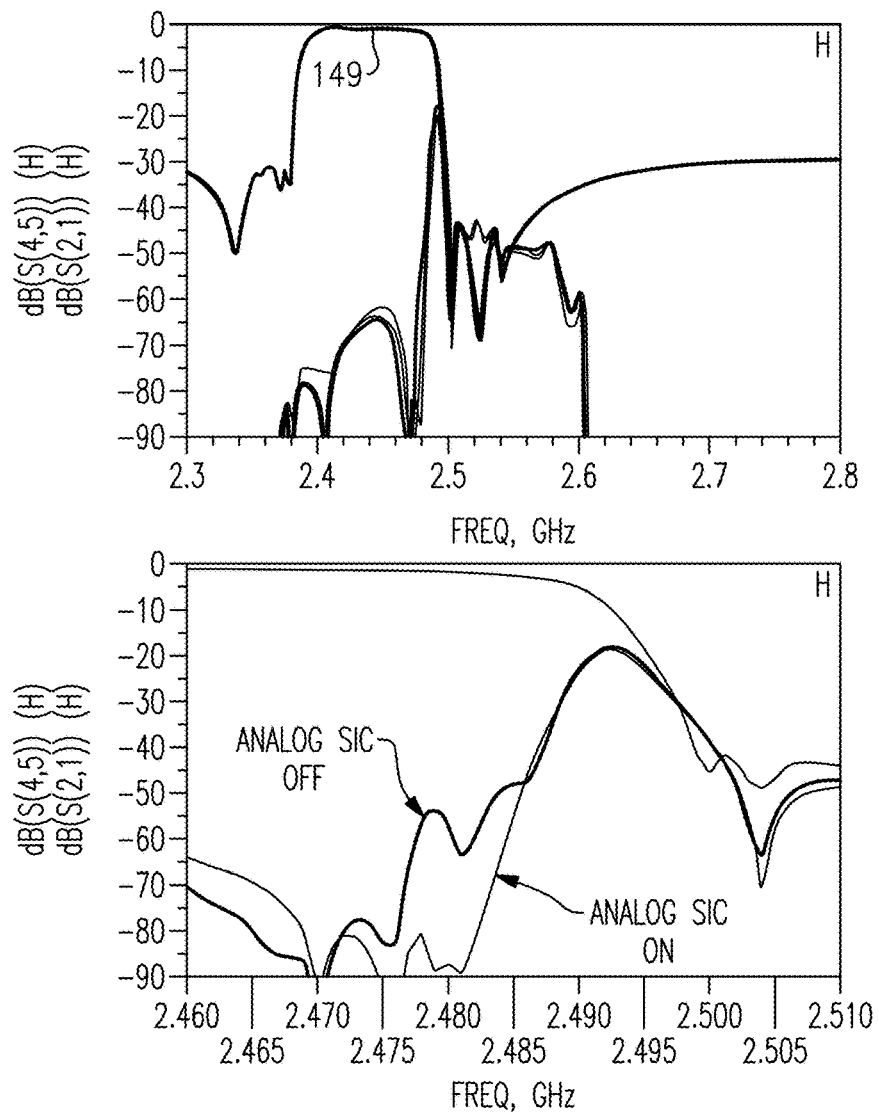
FIG. 6B is a schematic diagram of one example of gain versus frequency simulations for the interference cancellation circuit of FIG. 6A.

FIG. 6B is a schematic diagram of one example of gain versus frequency simulations for the interference cancellation circuit 135 of FIG. 6A. The simulations include an upper graph and a lower graph. The upper graph includes a portion 149 depicting the impact in the frequency domain of the cancellation with respect to the bandwidth of the bandpass filter 136.

Figure 6C:
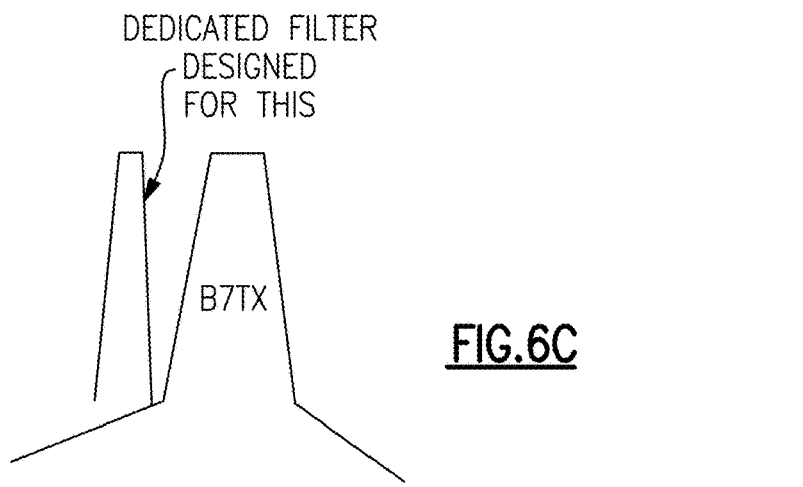
FIG. 6C is a schematic diagram of one example of frequency spectrum characteristics for the interference cancellation circuit of FIG. 6A.

FIG. 6C is a schematic diagram of one example of frequency spectrum characteristics for the interference cancellation circuit of FIG. 6A. As shown in FIG. 6C, the WiFi bandpass filter 136 is implemented with a passband that rejects a Band 7 carrier frequency while passing spectral regrowth that serves to interfere with reception of WiFi signals.

Figure 7A:
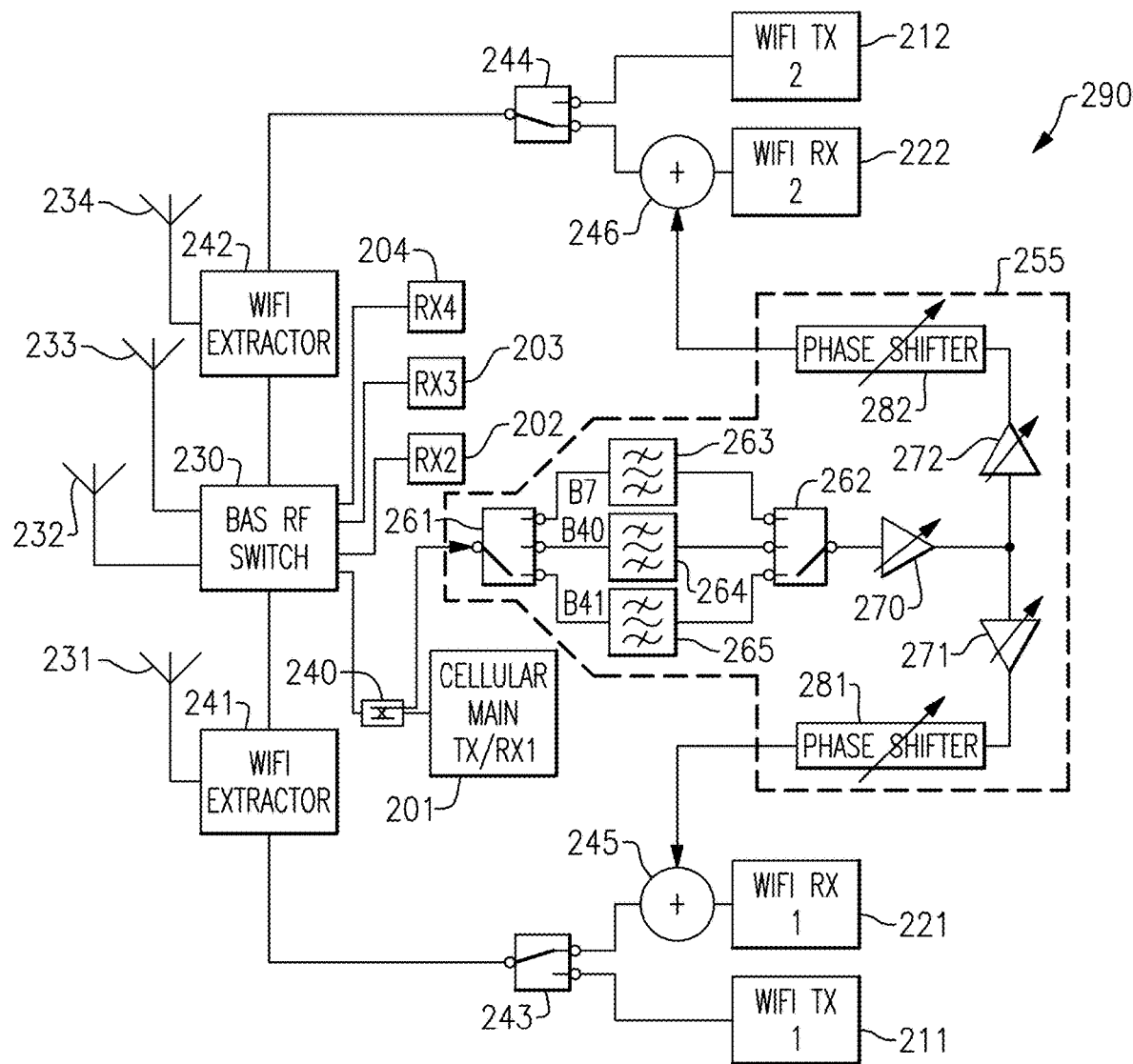
FIG. 7A is a schematic diagram of an RF communication system with interference cancellation according to another embodiment.

FIG. 7A is a schematic diagram of an RF communication system 290 with interference cancellation according to another embodiment. The RF communication system 290 includes a cellular transceiver 201 (including a cellular transmitter and a first cellular receiver), a second cellular receiver 202, a third cellular receiver 203, a fourth cellular receiver 204, a first WiFi transmitter 211, a second WiFi transmitter 212, a first WiFi receiver 221, a second WiFi receiver 222, an antenna switch 230, a first antenna 231, a second antenna 232, a third antenna 233, a fourth antenna 234, a cellular directional coupler 240, a first WiFi extractor 241, a second WiFi extractor 242, a first WiFi transmit/receive switch 243, a second WiFi transmit/receive switch 244, a first signal combiner 245, a second signal combiner 246, and an interference cancellation circuit 255.

In the illustrated embodiment, the interference cancellation circuit 255 includes a first multi-throw switch 261, a second multi-throw switch 262, a first filter 263, a second filter 264, a third filter 265, a shared controllable amplifier 270, a first separately controllable amplifier 271, a second separately controllable amplifier 272, a first controllable phase shifter 281, and a second controllable phase shifter 282. Although one embodiment of an interference cancellation circuit is shown, the teachings herein are applicable to interference cancellation circuits implemented in a wide variety of ways.

The interference cancellation circuit 255 generates separate interference cancellation signals for the first WiFi receiver 221 and the second WiFi receiver 222, in this embodiment. In certain implementations herein, an interference cancellation circuit provides interference cancellation to two or more receivers. As shown in FIG. 7A, the gain and phase of each interference cancellation signal is separately controllable, thereby providing precision cancellation to correctly compensate for an amount of interference present at the input of each WiFi receiver.

With continuing reference to FIG. 7A, the interference cancellation circuit 255 also includes the shared controllable amplifier 270 for providing common gain adjustment to the first and second interference compensation signals. In certain implementations herein, gain and/or phase of two or more interference cancellation signals can be commonly controlled in all or part.

The interference cancellation circuit 255 also includes multiple selectable filters, in this embodiment. The selected filter can be chosen based on a transmit frequency band of the cellular transmitter 201. For instance, in this example, the first filter 283 can be selected when transmitting Band 7, the second filter 284 can be selected when transmitting Band 40, and the third filter 285 can be selected when transmitting Band 41.

The first filter 283, the second filter 284, and the third filter 285 can have filter characteristics selected to receive a desired portion of the transmit signal suitable for cancellation. For example, in certain implementations, a carrier frequency of the transmit signal is rejected while ALCR noise is passed. For instance, FIG. 6C illustrates one example of a filter characteristic for the first filter 283. However, other implementations are possible.

In the illustrated embodiment, the first signal combiner 245 and the second signal combiner 246 are positioned at the inputs to the first WiFi receiver 221 and the second WiFi receiver 222, respectively. However, other implementations are possible.

As shown in FIG. 7A, the interference cancellation circuit 255 receives the transmit signal via the transmit path coupler 240. However, in other implementations, the transmit path coupler 240 is omitted.

Figure 7B:
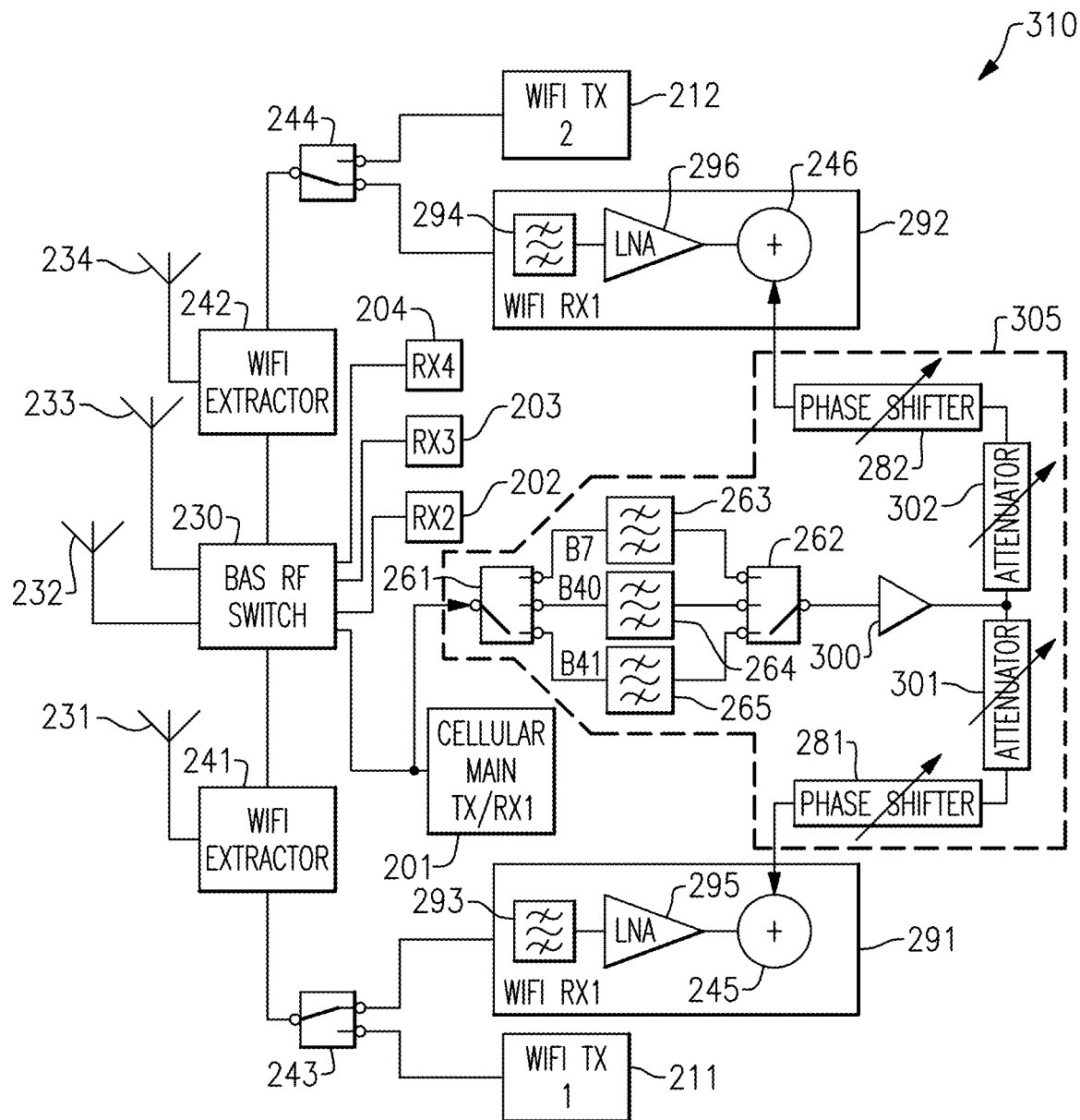
FIG. 7B is a schematic diagram of an RF communication system with interference cancellation according to another embodiment.

FIG. 7B is a schematic diagram of an RF communication system 310 with interference cancellation according to another embodiment. The RF communication system 310 includes a cellular transceiver 201, a second cellular receiver 202, a third cellular receiver 203, a fourth cellular receiver 204, a first WiFi transmitter 211, a second WiFi transmitter 212, a first WiFi receiver 291, a second WiFi receiver 292, an antenna switch 230, a first antenna 231, a second antenna 232, a third antenna 233, a fourth antenna 234, a first WiFi extractor 241, a second WiFi extractor 242, a first WiFi transmit/receive switch 243, a second WiFi transmit/receive switch 244, and an interference cancellation circuit 305.

In the illustrated embodiment, the first WiFi receiver 291 includes a first WiFi receive filter 293, a first WiFi LNA 295, and a first signal combiner 245, and the second WiFi receiver 292 includes a second WiFi receive filter 294, a second WiFi LNA 296, and a second signal combiner 246. Accordingly, the interference cancellation signals are provided after the LNAs, in this embodiment.

Injecting the interference cancellation signals after the LNAs provides a number of advantages, such as relaxed dynamic range constraints.

With continuing reference to FIG. 7B, the interference cancellation circuit 305 includes a first multi-throw switch 261, a second multi-throw switch 262, a first filter 263, a second filter 264, a third filter 265, a shared amplifier 300, a first controllable attenuator 301, a second controllable attenuator 302, a first controllable phase shifter 281, and a second controllable phase shifter 282.

The interference cancellation circuit 305 illustrates another embodiment of an interference cancellation circuit suitable for providing interference cancellation to multiple receivers. However, the teachings herein are applicable to interference cancellation circuits implemented in a wide variety of ways.

Figure 7C:
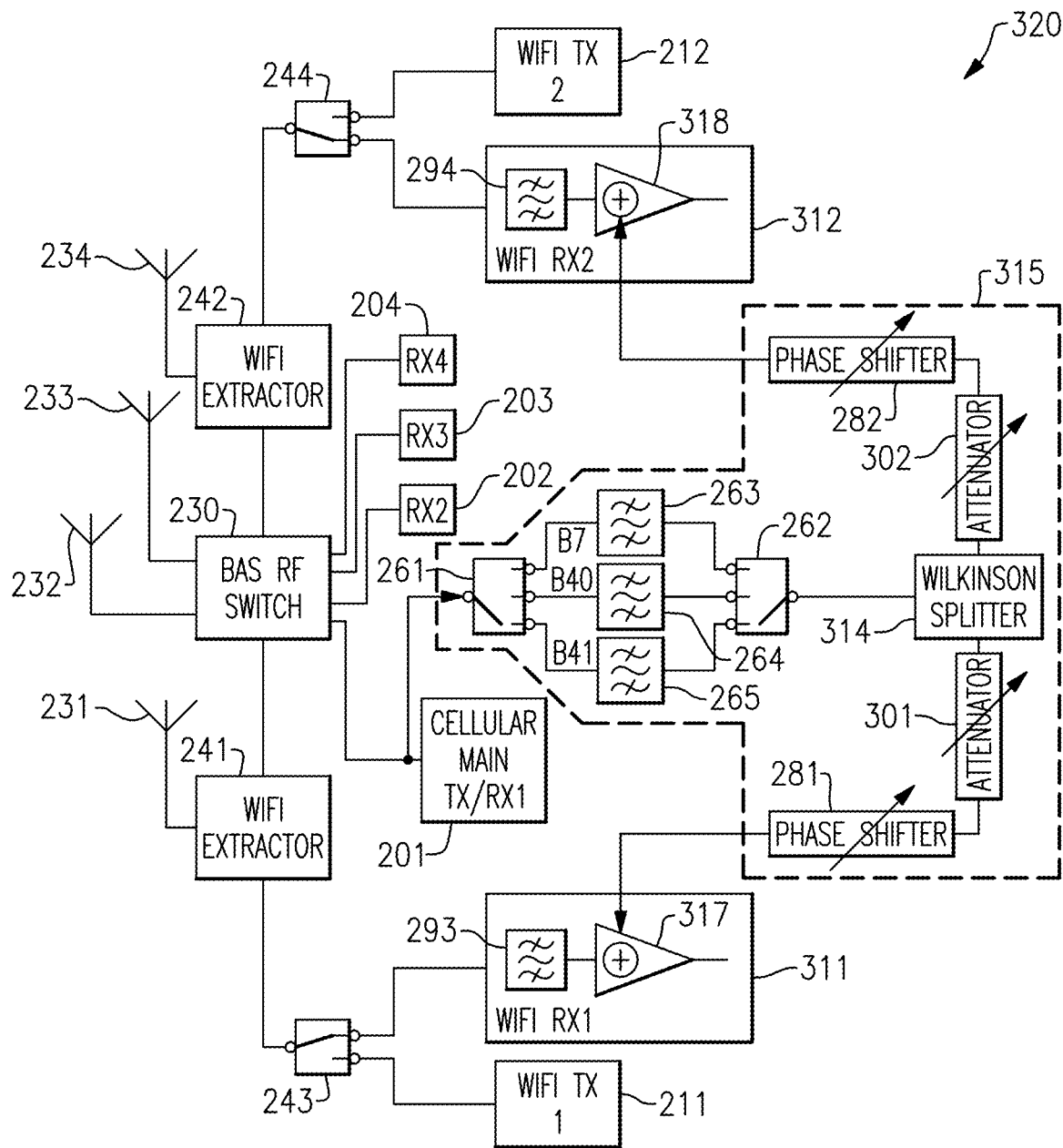
FIG. 7C is a schematic diagram of an RF communication system with interference cancellation according to another embodiment.

FIG. 7C is a schematic diagram of an RF communication system 320 with interference cancellation according to another embodiment. The RF communication system 320 includes a cellular transceiver 201, a second cellular receiver 202, a third cellular receiver 203, a fourth cellular receiver 204, a first WiFi transmitter 211, a second WiFi transmitter 212, a first WiFi receiver 311, a second WiFi receiver 312, an antenna switch 230, a first antenna 231, a second antenna 232, a third antenna 233, a fourth antenna 234, a first WiFi extractor 241, a second WiFi extractor 242, a first WiFi transmit/receive switch 243, a second WiFi transmit/receive switch 244, and an interference cancellation circuit 315.

In the illustrated embodiment, the first WiFi receiver 311 includes a first WiFi receive filter 293 and a first WiFi LNA 317, and the second WiFi receiver 312 includes a second WiFi receive filter 294 and a second WiFi LNA 318. Accordingly, the interference cancellation signals are provided into the LNAs, in this embodiment. For example, the interference cancellation signals can be injected between stages of the LNA, using gain transistors that operate in parallel to transistors used for signal amplification, and/or in a wide variety of other ways.

Injecting the interference cancellation circuits into the LNAs can provide a number of advantages, such as relaxed linearity constraints of the LNAs.

With continuing reference to FIG. 7C, the interference cancellation circuit 315 includes a first multi-throw switch 261, a second multi-throw switch 262, a first filter 263, a second filter 264, a third filter 265, a Wilkinson splitter 314, a first controllable attenuator 301, a second controllable attenuator 302, a first controllable phase shifter 281, and a second controllable phase shifter 282.

The interference cancellation circuit 315 illustrates another embodiment of an interference cancellation circuit suitable for providing interference cancellation to multiple receivers. However, the teachings herein are applicable to interference cancellation circuits implemented in a wide variety of ways.

Figure 8:
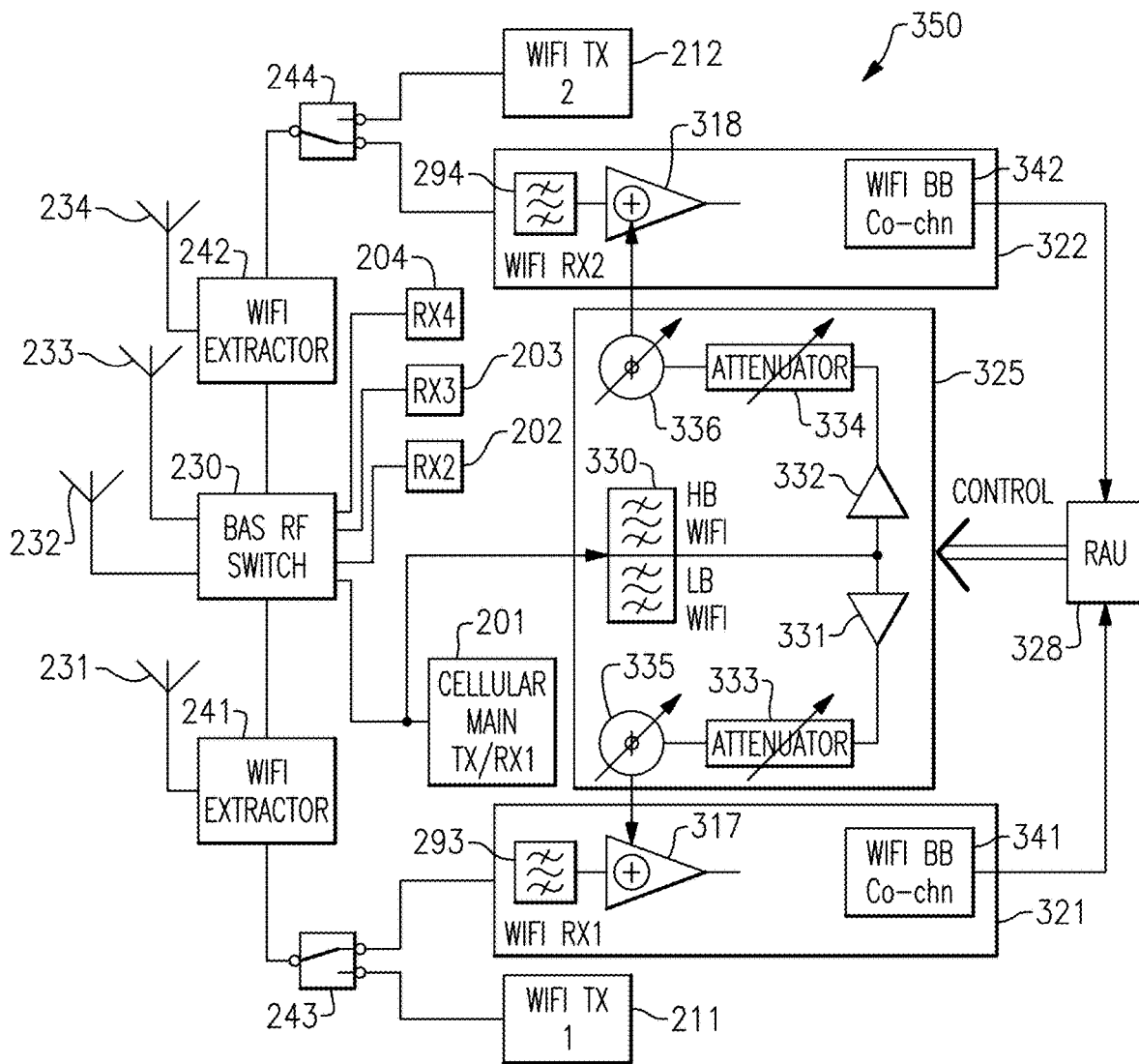
FIG. 8 is a schematic diagram of an RF communication system with interference cancellation according to another embodiment.

FIG. 8 is a schematic diagram of an RF communication system 350 with interference cancellation according to another embodiment. The RF communication system 350 includes a cellular transceiver 201, a second cellular receiver 202, a third cellular receiver 203, a fourth cellular receiver 204, a first WiFi transmitter 211, a second WiFi transmitter 212, a first WiFi receiver 321, a second WiFi receiver 322, an antenna switch 230, a first antenna 231, a second antenna 232, a third antenna 233, a fourth antenna 234, a first WiFi extractor 241, a second WiFi extractor 242, a first WiFi transmit/receive switch 243, a second WiFi transmit/receive switch 244, an interference cancellation circuit 325, and a radio access unit (RAU) 328.

The first WiFi receiver 321 of FIG. 8 is similar to the first WiFi receiver 311 of FIG. 7C, except that the first WiFi receiver 321 further includes a WiFi baseband (BB) co-channel circuit 341 for communication with the RAU 328. Additionally, the second WiFi receiver 322 of FIG. 8 is similar to the second WiFi receiver 312 of FIG. 7C, except that the second WiFi receiver 322 further includes a WiFi BB co-channel circuit 342 for communication with the RAU 328.

As shown in FIG. 8, the RAU 328 controls the interference cancellation circuit 325, for instance, to set gain and/or phase adjustment values for interference cancellation. In certain implementations, signal to noise ratio is measured or sensed at a victim receiver and used to tune the attenuators and/or phase shifters of the interference cancellation circuit 325 to enhance the accuracy of interference cancellation.

The interference cancellation circuit 325 includes a diplexer 330, a first amplifier 331, a second amplifier 332, a first controllable attenuator 333, a second controllable attenuator 334, a first controllable phase shifter 335, and a second controllable phase shifter 336. The first amplifier 331 and the second amplifier 332 serves as buffers to isolate the branches used for interference cancellation. When a gain of the first amplifier 331 and the second amplifier 332 is sufficiently high, the noise figure is low and a relatively small and cost effective solution is achieved.

The interference cancellation circuit 325 illustrates another embodiment of an interference cancellation circuit suitable for providing interference cancellation to multiple receivers. However, the teachings herein are applicable to interference cancellation circuits implemented in a wide variety of ways.

Figure 9:
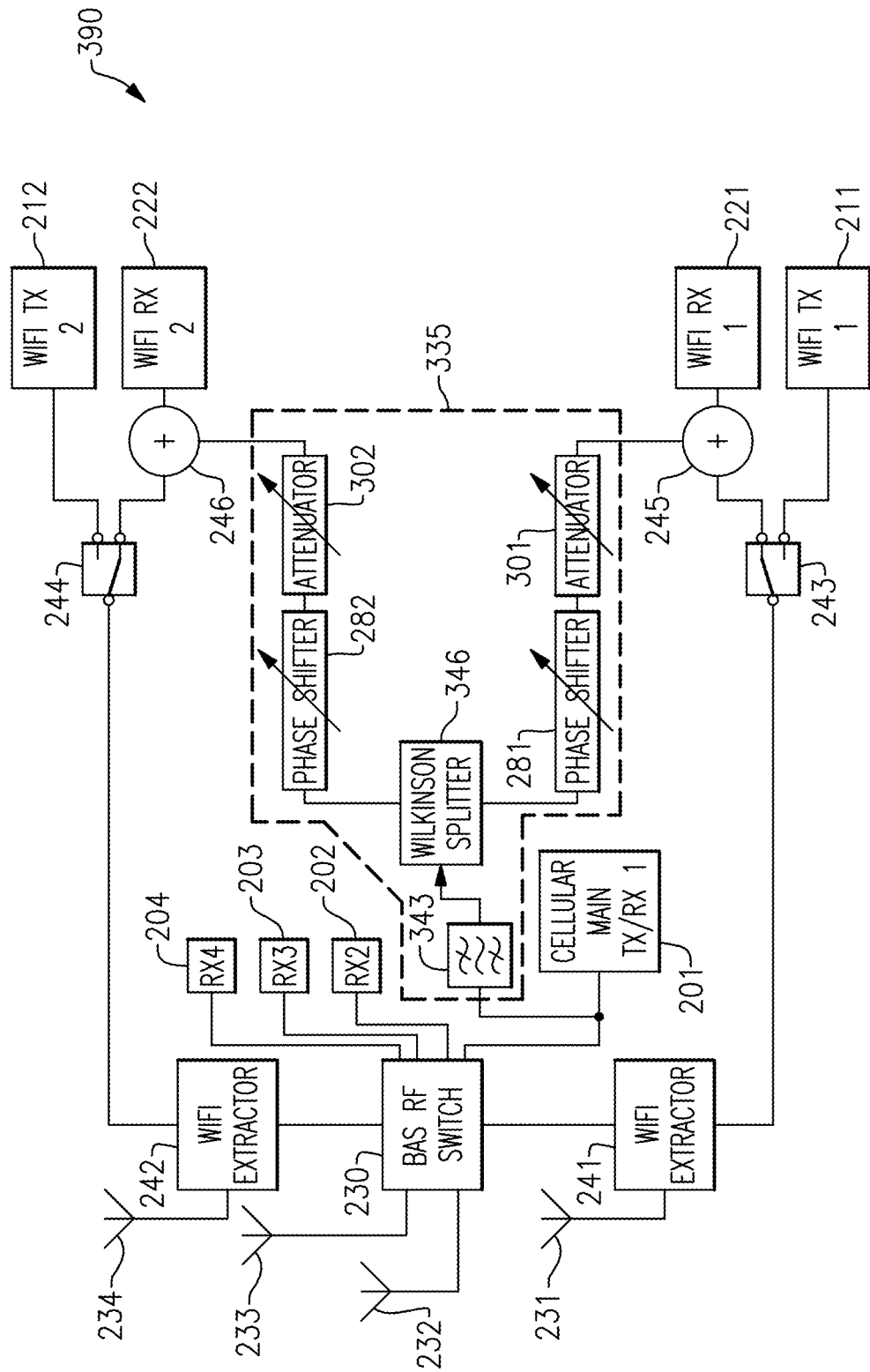
FIG. 9 is a schematic diagram of an RF communication system with interference cancellation according to another embodiment.

FIG. 9 is a schematic diagram of an RF communication system 390 with interference cancellation according to another embodiment. The RF communication system 390 includes a cellular transceiver 201, a second cellular receiver 202, a third cellular receiver 203, a fourth cellular receiver 204, a first WiFi transmitter 211, a second WiFi transmitter 212, a first WiFi receiver 221, a second WiFi receiver 222, an antenna switch 230, a first antenna 231, a second antenna 232, a third antenna 233, a fourth antenna 234, a first WiFi extractor 241, a second WiFi extractor 242, a first WiFi transmit/receive switch 243, a second WiFi transmit/receive switch 244, a first signal combiner 245, a second signal combiner 246, and an interference cancellation circuit 335.

In the illustrated embodiment, the interference cancellation circuit 335 includes a filter 343, a Wilkinson splitter 346, a first controllable phase shifter 281, a second controllable phase shifter 282, a first controllable attenuator 301, and a second controllable attenuator 302.

The interference cancellation circuit 335 illustrates another embodiment of an interference cancellation circuit suitable for providing interference cancellation to multiple receivers. However, the teachings herein are applicable to interference cancellation circuits implemented in a wide variety of ways.

Figure 10:
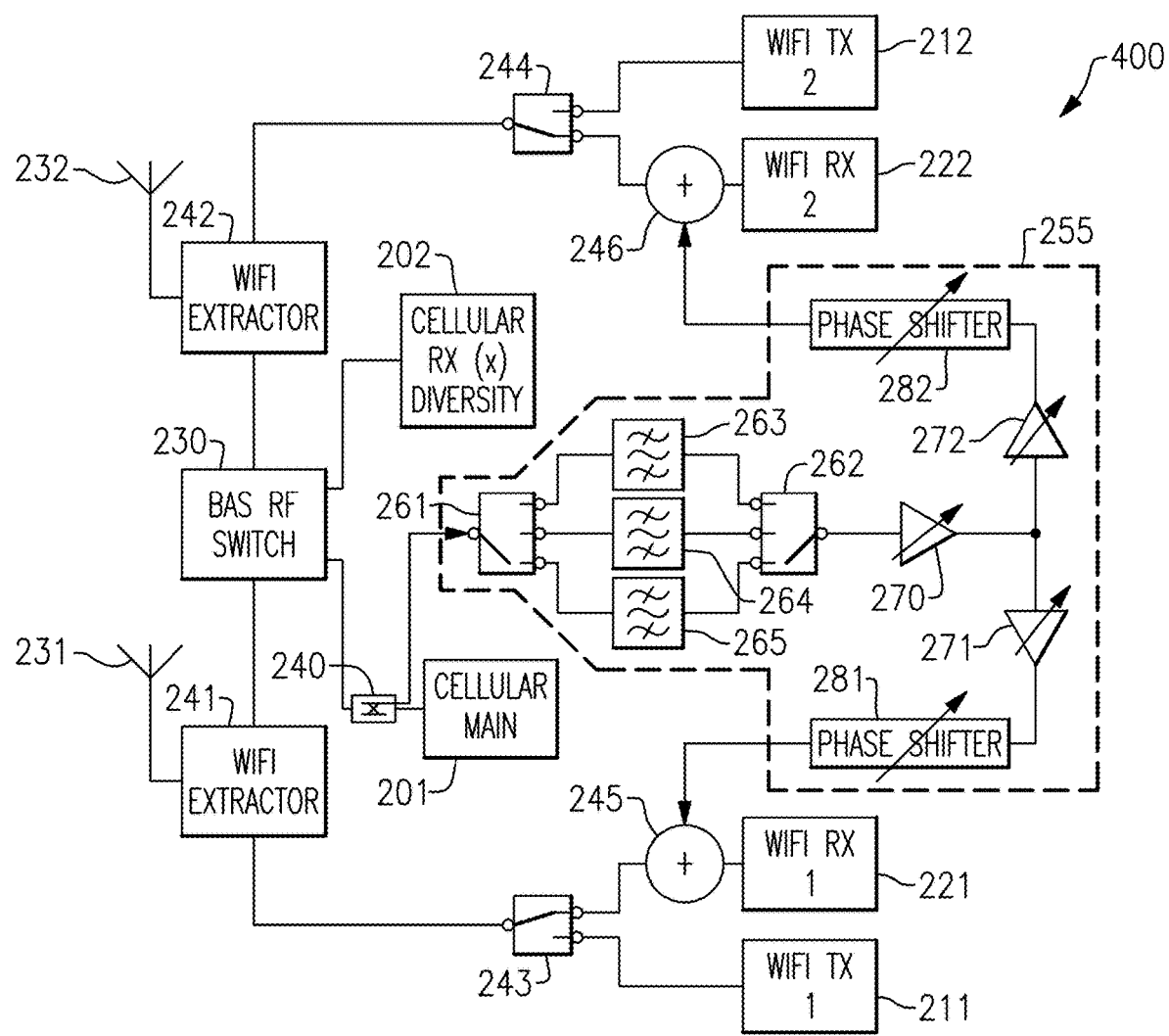
FIG. 10 is a schematic diagram of an RF communication system with interference cancellation according to another embodiment.

FIG. 10 is a schematic diagram of an RF communication system 400 with interference cancellation according to another embodiment. The RF communication system 400 includes a cellular transceiver 201, a second cellular receiver 202, a first WiFi transmitter 211, a second WiFi transmitter 212, a first WiFi receiver 221, a second WiFi receiver 222, an antenna switch 230, a first antenna 231, a second antenna 232, a cellular directional coupler 240, a first WiFi extractor 241, a second WiFi extractor 242, a first WiFi transmit/receive switch 243, a second WiFi transmit/receive switch 244, a first signal combiner 245, a second signal combiner 246, and an interference cancellation circuit 255.

The RF communication system 400 of FIG. 10 is similar to the RF communication system 290 of FIG. 7A, except that the RF communication system 400 illustrates an implementation with fewer cellular receivers and antennas. The teachings herein are applicable to RF communication systems implemented in a wide variety of ways. For example, an RF communication system can be implemented with downlink MIMO, uplink MIMO, downlink diversity, uplink diversity, beamforming, shared antennas, separate antennas, and/or a range of other features.

Figure 11:
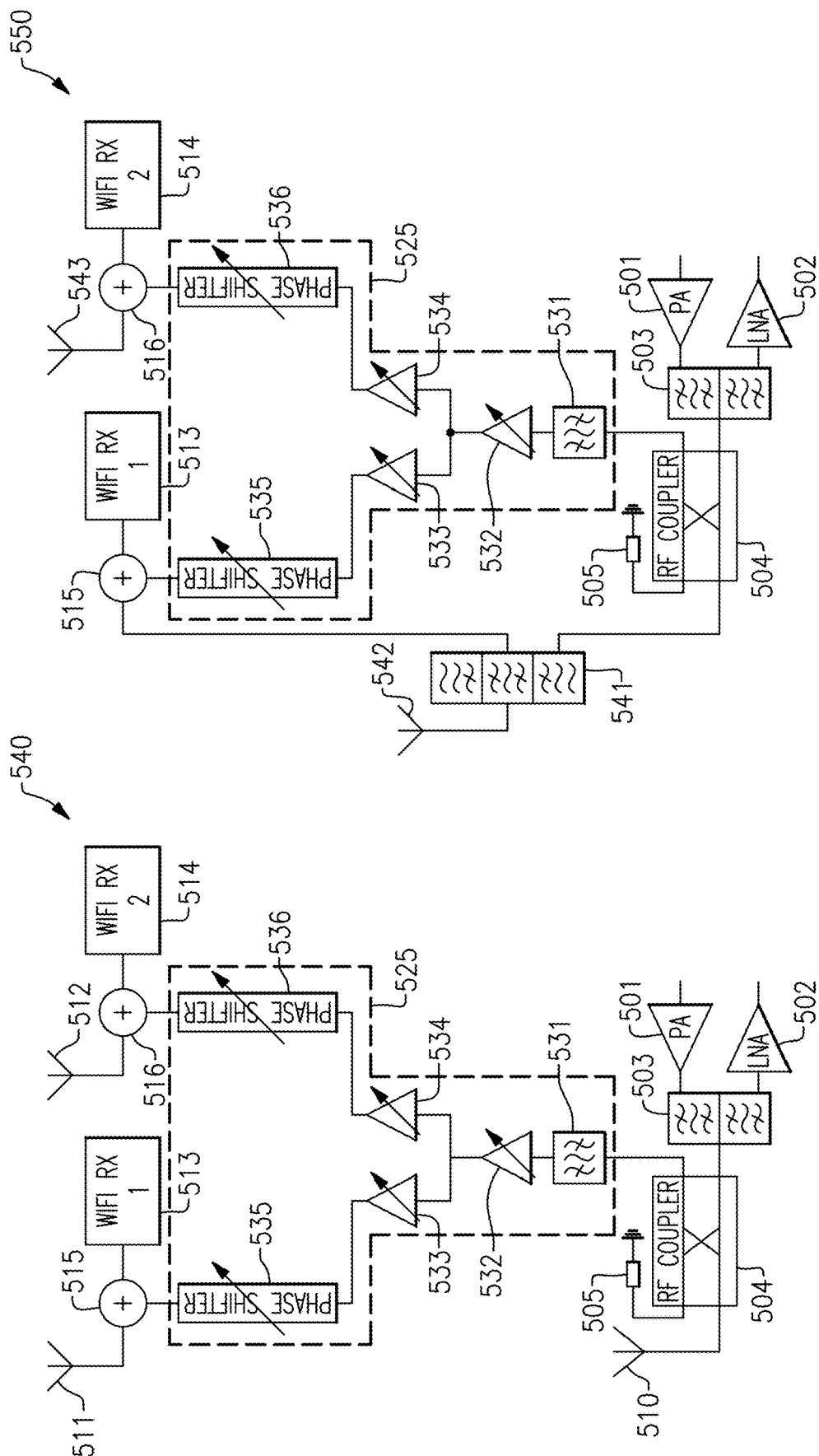
FIG. 11A is a schematic diagram of an RF communication system with interference cancellation according to another embodiment.
FIG. 11B is a schematic diagram of an RF communication system with interference cancellation according to another embodiment.

FIG. 11A is a schematic diagram of an RF communication system 540 with interference cancellation according to another embodiment. The RF communication system 540 includes a cellular power amplifier 501, a cellular LNA 502, a cellular duplexer 503, a cellular directional coupler 504, a coupler termination impedance 505, a cellular antenna 510, a first WiFi antenna 511, a second WiFi antenna 512, a first WiFi receiver 513, a second WiFi receiver 514, a first signal combiner 515, a second signal combiner 516, and an interference cancellation circuit 525.

In the illustrated embodiment, the interference cancellation circuit 525 includes a filter 531, a shared controllable amplifier 532, a first separately controllable amplifier 533, a second separately controllable amplifier 534, a first controllable phase shifter 535, and a second controllable phase shifter 536.

The RF communication system 540 of FIG. 11A illustrates yet another embodiment of an RF communication system with interference cancellation. However, the teachings herein are applicable to RF communication systems implemented in a wide variety of ways.

FIG. 11B is a schematic diagram of an RF communication system 550 with interference cancellation according to another embodiment. The RF communication system 550 includes a cellular power amplifier 501, a cellular LNA 502, a cellular duplexer 503, a cellular directional coupler 504, a coupler termination impedance 505, a first WiFi receiver 513, a second WiFi receiver 514, a first signal combiner 515, a second signal combiner 516, an interference cancellation circuit 525, a triplexer 541, and a shared antenna 542.

The RF communication system 550 of FIG. 11B illustrates yet another embodiment of an RF communication system with interference cancellation. However, the teachings herein are applicable to RF communication systems implemented in a wide variety of ways.

Figure 12:
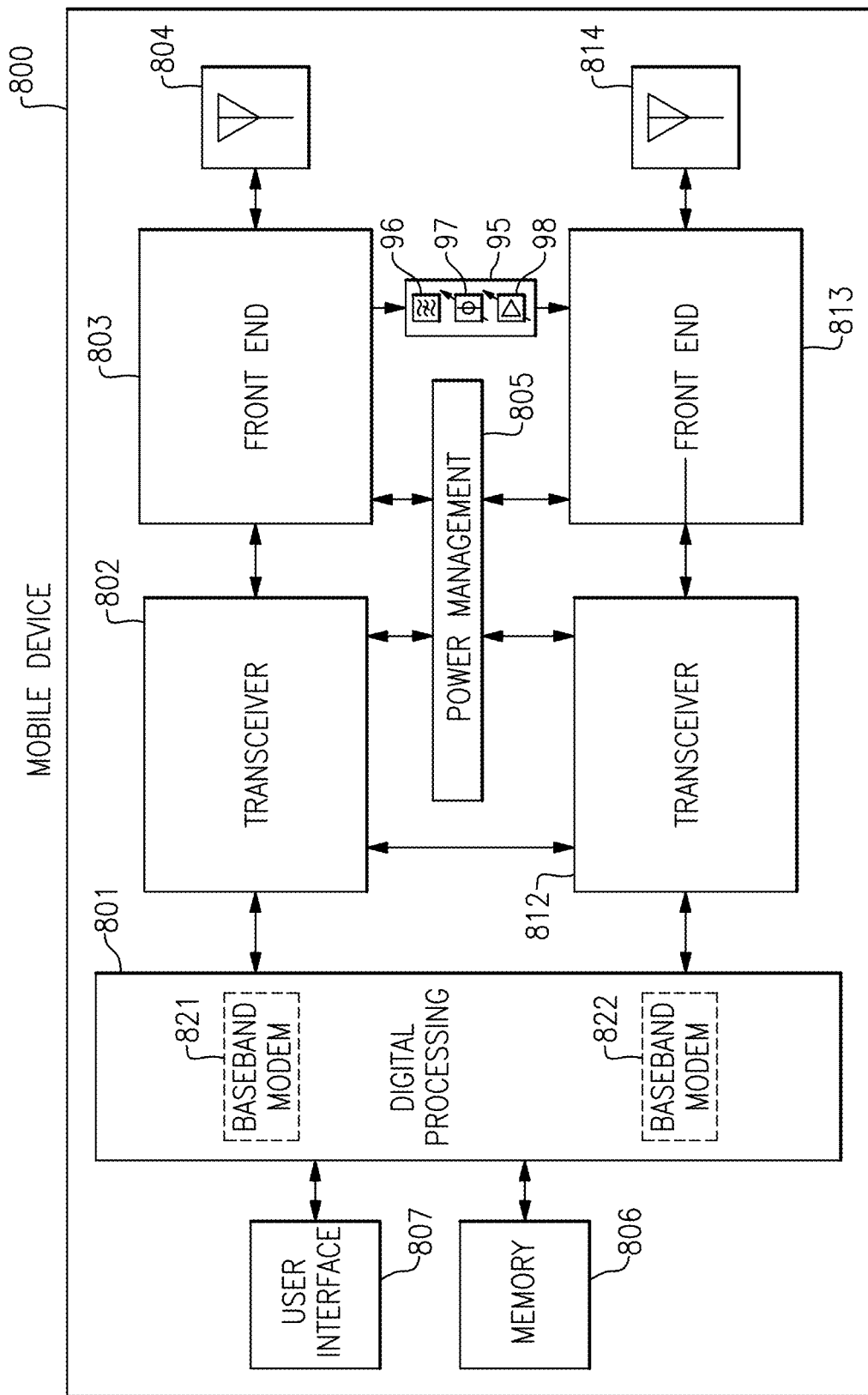
FIG. 12 is a schematic diagram of one embodiment of a mobile device with interference cancellation.

FIG. 12 is a schematic diagram of one embodiment of a mobile device 800 with interference cancellation. The mobile device 800 includes a digital processing system 801, a first transceiver 802, a second transceiver 812, a first front end system 803, a second front end system 813, a first antenna 804, a second antenna 814, a power management system 805, a memory 806, a user interface 807, and an interference cancellation circuit 95. As shown in FIG. 12, the interference cancellation circuit 95 includes a filter 96, a controllable phase circuit 97, and a controllable gain circuit 98. The interference cancellation circuit 95 can be implemented in accordance with any of the embodiments herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

In the illustrated embodiment, the digital processing circuit 801 includes a first baseband modem 821 and a second baseband modem 822. In certain implementations, the first baseband modem 821 and the second baseband modem 822 control communications associated with different types of wireless communications, for instance, cellular and WiFi. As shown in FIG. 12, the first baseband modem 821, the first transceiver 802, and the first front end system 803 operate to transmit and receive RF signals using the first antenna 804. Additionally, the second baseband modem 822, the second transceiver 812, and the second front end system 813 operate to transmit and receive RF signals using the second antenna 814. Although an example with two antennas is shown, the mobile device 800 can include additional antennas including, but not limited to, multiple antennas for cellular communications and/or multiple antenna for WiFi communications.

The first front end system 803 operates to condition RF signals transmitted by and/or received from the first antenna 804. Additionally, the second front end system 804 operates to condition RF signals transmitted by and/or received from the second antenna 814. The front end systems can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The first antenna 804 and the second antenna 814 can include antenna elements implemented in a wide variety of ways. In certain configurations, the antenna elements are arranged to form one or more antenna arrays. Examples of antenna elements include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 800 operates with beamforming. For example, the first front end system 803 and/or the second front end system 813 can include phase shifters having variable phase to provide beam formation and directivity for transmission and/or reception of signals. For example, in the context of signal transmission, the phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array from a particular direction.

The mobile device 800 of FIG. 12 illustrates one embodiment of a mobile device implemented with interference cancellation. Although one example of a mobile device is shown, the teachings herein are applicable a wide range of with interference cancellation schemes.

The digital processing system 801 is coupled to the user interface 807 to facilitate processing of various user input and output (I/O), such as voice and data. The digital processing system 801 provides the transceivers with digital representations of transmit signals, which are processed by the transceivers to generate RF signals for transmission. The digital processing system 801 also processes digital representations of received signals provided by the transceivers. As shown in FIG. 12, the digital processing system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 800, including, for example, a lithium-ion battery.

APPLICATIONS

Some of the embodiments described above have provided examples in connection with mobile devices. However, the principles and advantages of the embodiments can be used for any other systems or apparatus that have needs for interference cancellation for coexistence. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
    a transmitter including a power amplifier configured to amplify a radio frequency transmit signal to generate an amplified radio frequency transmit signal;
    a first receiver including a first low noise amplifier configured to amplify a first radio frequency receive signal; and
    an interference cancellation circuit including a filter configured to generate a first analog interference cancellation signal based on filtering the amplified radio frequency transmit signal, a first controllable phase circuit configured to provide a phase adjustment to the first analog interference cancellation signal, and a first controllable gain circuit configured to provide a gain adjustment to the first analog interference cancellation signal, the interference cancellation circuit configured to inject the first analog interference cancellation signal into the first low noise amplifier to compensate the first receiver for interference arising from the transmitter.

2. The mobile device of claim 1 further comprising a cellular transceiver including the transmitter, and a WiFi transceiver including the first receiver.

3. The mobile device of claim 1 wherein the filter includes a plurality of selectable filters providing different filtering characteristics.

4. The mobile device of claim 3 wherein a selected filter of the plurality of the selectable filters is chosen based on a transmit band of the transmitter.

5. The mobile device of claim 1 wherein the first analog interference cancellation signal compensates for interference arising from spectral regrowth.

6. The mobile device of claim 1 wherein the first receiver detects an amount of interference, and controls at least one of the phase adjustment or the gain adjustment based on the detected amount of interference.

7. The mobile device of claim 1 further comprising a second receiver including a second low noise amplifier configured to amplify a second radio frequency receive signal, the interference cancellation circuit further configured to inject a second analog interference cancellation signal into the second low noise amplifier to compensate the second receiver for interference arising from the transmitter.

8. The mobile device of claim 7 wherein the interference cancellation circuit includes a Wilkinson splitter having an input connected to the filter, and a first output connected to the first controllable phase circuit.

9. The mobile device of claim 8 wherein the interference cancellation circuit further includes a second controllable phase circuit configured to provide a phase adjustment to the second analog interference cancellation signal and a second controllable gain circuit configured to provide a gain adjustment to the second analog interference cancellation signal, the Wilkinson splitter further having a second output connected to the second controllable phase circuit.

10. The mobile device of claim 1 wherein the filter includes a diplexer configured to receive the amplified radio frequency transmit signal.

11. The mobile device of claim 1 further comprising a first antenna configured to transmit the amplified radio frequency transmit signal and a second antenna configured to receive the first radio frequency receive signal.

12. A method of interference cancellation in a mobile device, the method comprising:
    amplifying a radio frequency transmit signal to generate an amplified radio frequency transmit signal using a power amplifier of a transmitter;
    amplifying a first radio frequency receive signal using a first low noise amplifier of a first receiver;
    generating a first analog interference cancellation signal based on filtering the amplified radio frequency transmit signal using a filter;
    providing a phase adjustment to the first analog interference cancellation signal using a first controllable phase circuit;
    providing a gain adjustment to the first analog interference cancellation signal using a first controllable gain circuit; and
    compensating the first receiver for interference arising from the transmitter by injecting the first analog interference cancellation signal into the first low noise amplifier.

13. The method of claim 12 further comprising detecting an amount of interference using the first receiver, and controlling at least one of the phase adjustment or the gain adjustment based on the detected amount of interference.

14. The method of claim 12 further comprising amplifying a second radio frequency receive signal using a second low noise amplifier of a second receiver, and injecting a second analog interference cancellation signal into the second low noise amplifier to compensate the second receiver for interference arising from the transmitter.

15. The method of claim 14 further comprising providing the first analog interference cancellation signal and the second analog interference cancellation signal as outputs of a Wilkinson splitter.

16. The method of claim 15 further comprising providing a phase adjustment to the second analog interference cancellation signal using a second controllable phase circuit, and providing a gain adjustment to the second analog interference cancellation signal using a second controllable gain circuit.

17. An interference compensation system for a mobile device, the interference compensation system comprising:
    a power amplifier configured to amplify a radio frequency transmit signal to generate an amplified radio frequency transmit signal;
    a first low noise amplifier configured to amplify a first radio frequency receive signal; and
    an interference cancellation circuit including a filter configured to generate a first analog interference cancellation signal based on filtering the amplified radio frequency transmit signal, a first controllable phase circuit configured to provide a phase adjustment to the first analog interference cancellation signal, and a first controllable gain circuit configured to provide a gain adjustment to the first analog interference cancellation signal, the interference cancellation circuit configured to inject the first analog interference cancellation signal into the first low noise amplifier.

18. The interference compensation system of claim 17 further comprising a second low noise amplifier configured to amplify a second radio frequency receive signal, the interference cancellation circuit further configured to inject a second analog interference cancellation signal into the second low noise amplifier.

19. The interference compensation system of claim 18 wherein the interference cancellation circuit includes a Wilkinson splitter having an input connected to the filter, and a first output connected to the first controllable phase circuit.

20. The interference compensation system of claim 19 wherein the interference cancellation circuit further includes a second controllable phase circuit configured to provide a phase adjustment to the second analog interference cancellation signal and a second controllable gain circuit configured to provide a gain adjustment to the second analog interference cancellation signal, the Wilkinson splitter further having a second output connected to the second controllable phase circuit.

* * * * *